INVENTOR:
ARTHUR E. HILLIKER,
BY Q. Emmett Thompson
HIS ATTORNEY.

TRAFFIC SIGNAL SYNCHRONIZING SYSTEM AND APPARATUS

Filed July 27, 1961 21 Sheets-Sheet 2

INVENTOR:
ARTHUR E. HILLIKER,
BY Q. Emmett Thompson
HIS ATTORNEY.

INVENTOR:
ARTHUR E. HILLIKER:
BY A. Emmett Thompson
HIS ATTORNEY.

TRAFFIC SIGNAL SYNCHRONIZING SYSTEM AND APPARATUS

Filed July 27, 1961 21 Sheets-Sheet 4

INVENTOR:
ARTHUR E. HILLIKER,

BY A. Emmett Thompson
HIS ATTORNEY.

INVENTOR:
ARTHUR E. HILLIKER,
BY [signature]
HIS ATTORNEY.

INVENTOR:
ARTHUR E. HILLIKER,
BY R. Emmett Thompson
HIS ATTORNEY.

INVENTOR:
ARTHUR E. HILLIKER,
BY Q. Emmett Thompson
HIS ATTORNEY.

May 18, 1965 A. E. HILLIKER 3,184,709

TRAFFIC SIGNAL SYNCHRONIZING SYSTEM AND APPARATUS

Filed July 27, 1961 21 Sheets-Sheet 8

INVENTOR:
ARTHUR E. HILLIKER,

BY Q. Emmett Thompson
HIS ATTORNEY.

May 18, 1965 A. E. HILLIKER 3,184,709

TRAFFIC SIGNAL SYNCHRONIZING SYSTEM AND APPARATUS

Filed July 27, 1961 21 Sheets-Sheet 9

INVENTOR:
ARTHUR E. HILLIKER,
BY D. Emmett Thompson
HIS ATTORNEY.

INVENTOR:
ARTHUR E. HILLIKER,

BY Q. Emmett Thompson
HIS ATTORNEY.

INVENTOR:
ARTHUR E. HILLIKER,
BY D. Emmett Thompson
HIS ATTORNEY.

INVENTOR:
ARTHUR E. HILLIKER,

BY [signature]

HIS ATTORNEY.

TRAFFIC SIGNAL SYNCHRONIZING SYSTEM AND APPARATUS

Filed July 27, 1961 21 Sheets-Sheet 13

INVENTOR:
ARTHUR E. HILLIKER,

BY D. Emmett Thompson
HIS ATTORNEY.

TRAFFIC SIGNAL SYNCHRONIZING SYSTEM AND APPARATUS

Filed July 27, 1961 21 Sheets-Sheet 14

INVENTOR:
ARTHUR E. HILLIKER,

BY Q. Emmett Thompson

HIS ATTORNEY.

May 18, 1965 A. E. HILLIKER 3,184,709

TRAFFIC SIGNAL SYNCHRONIZING SYSTEM AND APPARATUS

Filed July 27, 1961 21 Sheets-Sheet 15

INVENTOR:
ARTHUR E. HILLIKER,

BY [signature]
HIS ATTORNEY.

INVENTOR:
ARTHUR E. HILLIKER,
BY A. Emmett Thompson
HIS ATTORNEY.

May 18, 1965 A. E. HILLIKER 3,184,709

TRAFFIC SIGNAL SYNCHRONIZING SYSTEM AND APPARATUS

Filed July 27, 1961 21 Sheets-Sheet 17

INVENTOR:
ARTHUR E. HILLIKER,

BY A. Everett Thompson
HIS ATTORNEY.

INVENTOR:
ARTHUR E. HILLIKER,
BY P. Emmett Thompson
HIS ATTORNEY.

INVENTOR:
ARTHUR E. HILLIKER,
BY A. Emmett Thompson
HIS ATTORNEY.

INVENTOR:
ARTHUR E. HILLIKER,

BY Q. Emmett Thompson
HIS ATTORNEY.

May 18, 1965 A. E. HILLIKER 3,184,709

TRAFFIC SIGNAL SYNCHRONIZING SYSTEM AND APPARATUS

Filed July 27, 1961 21 Sheets-Sheet 21

INVENTOR:
ARTHUR E. HILLIKER,

BY D. Emmett Thompson

HIS ATTORNEY.

3,184,709
TRAFFIC SIGNAL SYNCHRONIZING SYSTEM AND APPARATUS

Arthur E. Hilliker, Pulaski, N.Y., assignor to Crouse-Hinds Company, Syracuse, N.Y., a corporation of New York Filed July 27, 1961, Ser. No. 127,215
5 Claims. (Cl. 340—37)

Figure 1:
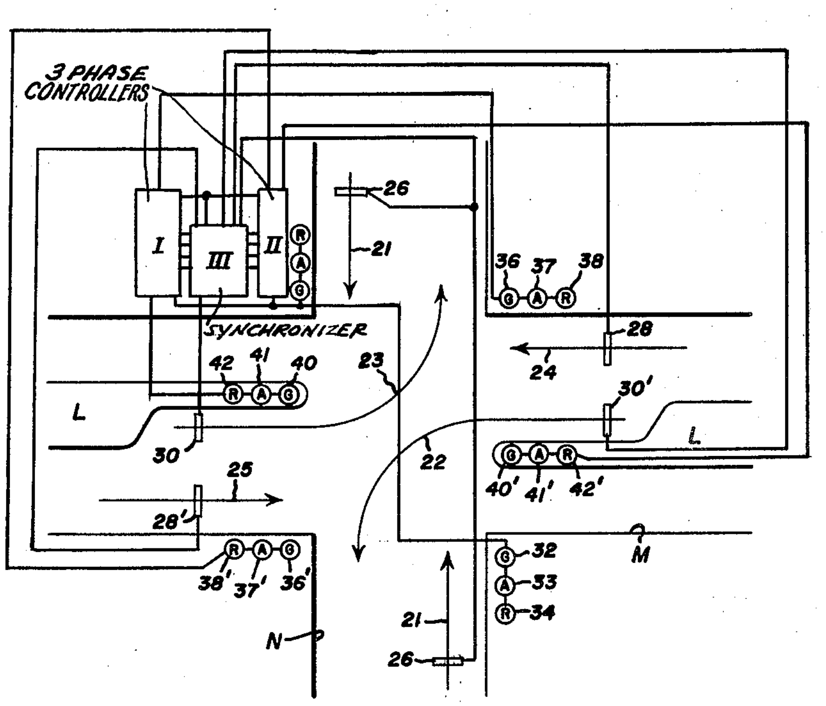

In my prior application Serial Number 51,052, filed August 22, 1960, entitled "Traffic Control System," there is disclosed an arrangement for controlling the flow of a plurality of movements through an intersection of a main street and a cross street wherein each approach to the intersection of the main street is provided with a left turn lane. The installation and operation of the system disclosed and claimed in the above referred to co-pending application resulted in a certain inefficiency in the movement of traffic through the intersection under specified conditions.

For example, where two non-conflicting traffic movements on the main street had received detector actuations of the detection means associated with each traffic movement and only one of these movements continued to receive actuations, an actuation of the detection means associated with the cross street caused the signal display to the movement on the main street not receiving any further vehicle actuations to be changed from proceed to stop, while the other non-conflicting movement on the main street continued to receive the proceed or right of way signal display until the expiration of a maximum time interval. This was occasioned by the manner of operation of the two full-actuated three-movement traffic controllers which are interconnected with each other and the detector means and signal means for each of the traffic movements on the streets comprising the intersection as disclosed in application Serial Number 51,052.

Such a result, however, is inefficient for the reason that both of the non-conflicting movements on the main street should continue to receive the right of way signal display where only one of the movements is receiving additional vehicle actuations during and after the detection means for the cross street is actuated in order to allow the maximum number of vehicles approaching the intersection on the non-conflicting movements of the main street to pass through the intersection before the right of way signal display is transferred to the cross street.

As a more specific example, let it be assumed that after the two non-conflicting movements on the main street have received their initial actuation of the vehicle detection means associated therewith, there is a lull in the traffic on one of the movements. At this time if an actuation of the detection means associated with the cross street is received, the system disclosed in application Serial Number 51,052 will function to change the signal display to the movement having the lull in traffic from proceed to stop while the other movement which is receiving repeated vehicle actuations will continue to receive the proceed signal display for a predetermined maximum time interval. If, at this point, additional traffic approaches the intersection on the movement which previously had a lull in traffic, the signal display on this movement having been proceed changed to stop, this additional traffic will not be able to proceed through the intersection even though the other non-conflicting movement is still receiving the proceed signal indication. As will be obvious, this is an inefficient movement of traffic through the intersection and it is therefore desirable that under such conditions the signal display for both non-conflicting movements should continue to receive the proceed indication for the maximum time interval.

It is, therefore as a general object of this invention to provide a new and improved traffic control system.

More particularly, it is an object of this invention to provide a new and improved traffic control system for controlling the flow of traffic through an intersection of at least two streets wherein at least one of said streets is provided with left turn lanes on each of the approaches of said street to the intersection.

Further, it is an object of this invention to provide a system and apparatus for synchronizing vehicle detections received on non-conflicting movements of one of the streets comprising the intersection whereby to synchronize the right of way signal display to both of the non-conflicting movements when only one of the movements receives repeated actuations, during and after an actuation of a detection means associated with the traffic movements on the other street of said intersection.

In describing the invention herein, reference may be had to my co-pending application, above identified, and to the co-pending application of W. M. Jeffers, Serial No. 47,492, filed August 4, 1960, now U.S. Patent No. 3,146,421, and entitled "Traffic Signal Controller," for a more complete disclosure of some of the components comprising of this invention.

The invention consists in the novel features and in the combinations and constructions hereinafter set forth and claimed.

In describing this invention, reference is had to the accompanying drawings in which like characters designate corresponding parts in all views.

In the drawings:

FIGURE 1 is a schematic illustration of an intersection comprising a main street and a cross street having a plurality of traffic movements therethrough, being in this illustration Five in number, showing in dashed lines the components associated with the intersection to control the traffic movements and the interconnection between these components and the signal means and detector means associated with each movement and wherein the arrows indicate the various traffic movements through the intersection.

Figure 2:
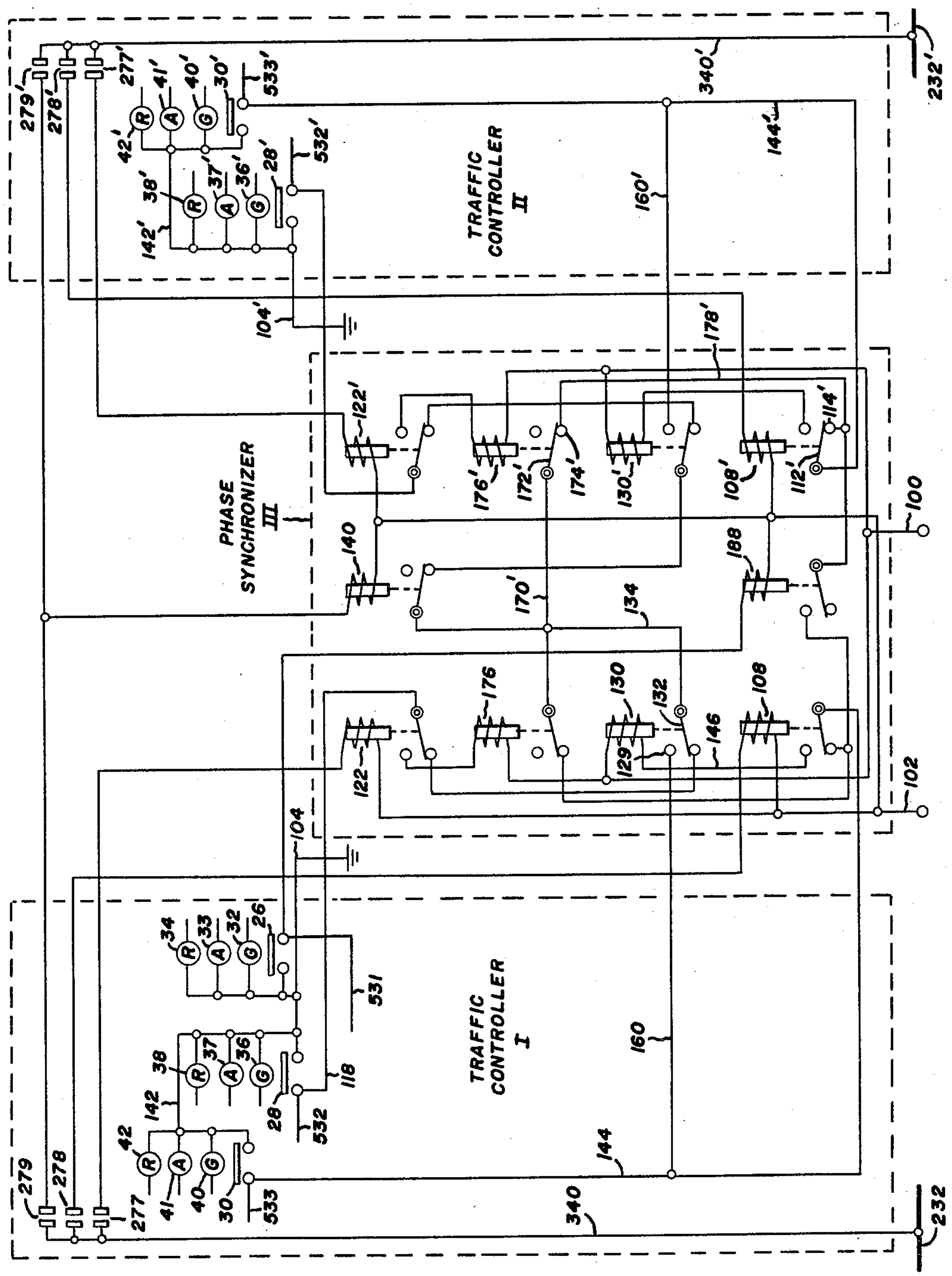

FIGURE 2 is a circuit diagram, somewhat schematic in nature, showing in phase the synchronizer unit interconected with portions of traffic controller I and traffic controller II for controlling the movement of traffic through the intersection shown in FIGURE 1.

FIGURES 3 to 21 inclusive are circuit diagrams showing the circuit of FIGURE 2 in various conditions of energization and wherein the heavy lines indicate the portions of the circuit then conducting current.

Figure 22:
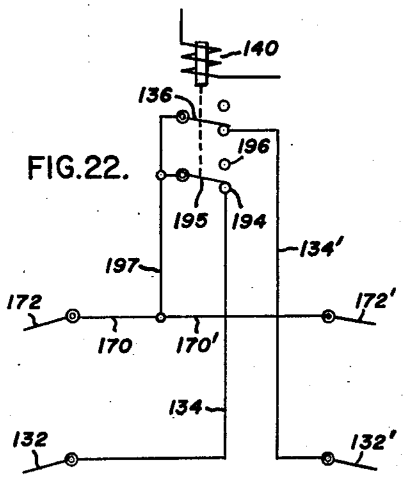

FIGURE 22 is a view showing a modified portion of the circuit of the phase synchronizer unit.

Briefly described, the invention of this application comprises a system and apparatus for synchronizing the right of way signal display for the intersection of a main street and a cross street, each of said streets having a traffic lane for traffic progressing straight through said intersection, each approach to said intersection on said main street having a turning traffic lane, the traffic movement on said straight through lane and turn lane for each approach of said main street being non-conflicting, the traffic movement on said turning lanes being non-conflicting, the traffic movemet on said straight through lanes of said main street being non-conflicting, the traffic movement on said through lanes of said cross street being conflicting with all of said movements on said main street, the traffic movement on each through lane of each approach of said main street being conflicting with the traffic movement on the turn lane of the opposite approach of said main street detection means and signal means associated with each of said lanes, the signal means for two of said conflicting lanes on said main street being controlled by a first full-actuated three-movement sequential controller, the signal means for the other two of said conflicting lanes on said main street being controlled by a second full-actuated three-movement sequential controller whereby said first and second controllers may simultaneously present a right of way signal display sequence to any two of said non-conflicting lanes in response to actuation of the detection means associated with said lanes, said controllers being interconnected to jointly present a right of way signal display sequence to said cross street lanes in response to actuation of the detection means associated with said cross street lanes, synchronizing means interconnected with said first and second controllers to synchronize the detection means in response to actuation thereof for any two of said non-conflicting lanes on said main street whereby the right of way signal display will be presented and maintained for a predetermined maximum to said non-conflicting lanes in response to repeated actuation of the detection means associated with only one of said non-conflicting lanes during and after the actuation of detection means associated with said cross street lanes.

While the preferred embodiment of the invention will be disclosed and described in connection with an intersection of the type shown in FIGURE 1 to be understood that such disclosure and description is by way of illustration only and is not intended to be limiting in any sense and that the scope of the invention is limited only by the appended claims.

In describing the invention, it will be assumed that the signal means for the two streets comprising the intersection are in combination displaying the right of way to certain movements of traffic through the intersection and for each condition of signal energization combination, the operation of the invention will be described and illustrated when various detection means associated with the movements are actuated.

Figure 3:
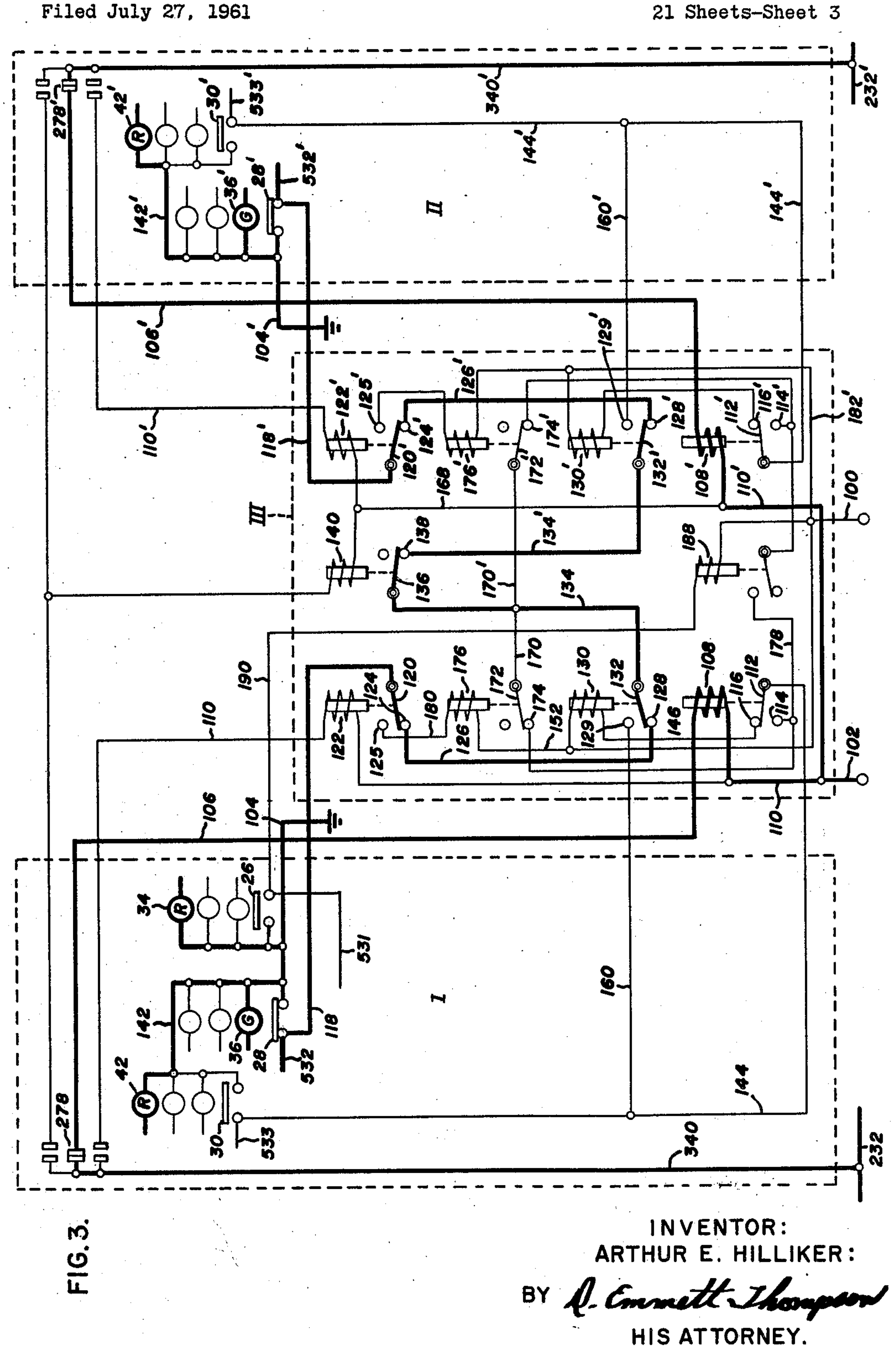

These conditions and the figures of the drawings showing circuits under these conditions are as follows:

(A) Movements four and five have the right of way (FIG. 3).

Figure 4:
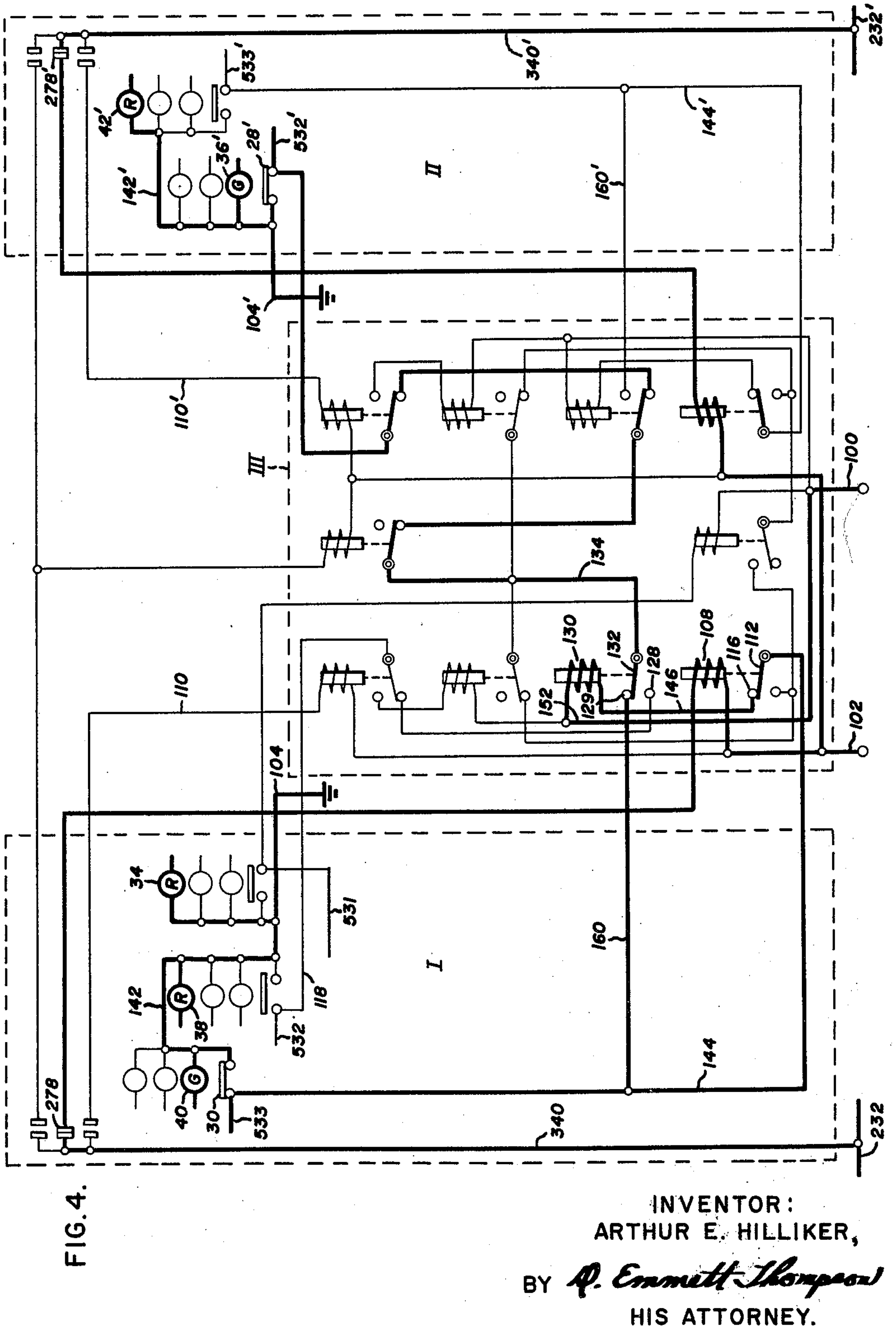
Figure 5:
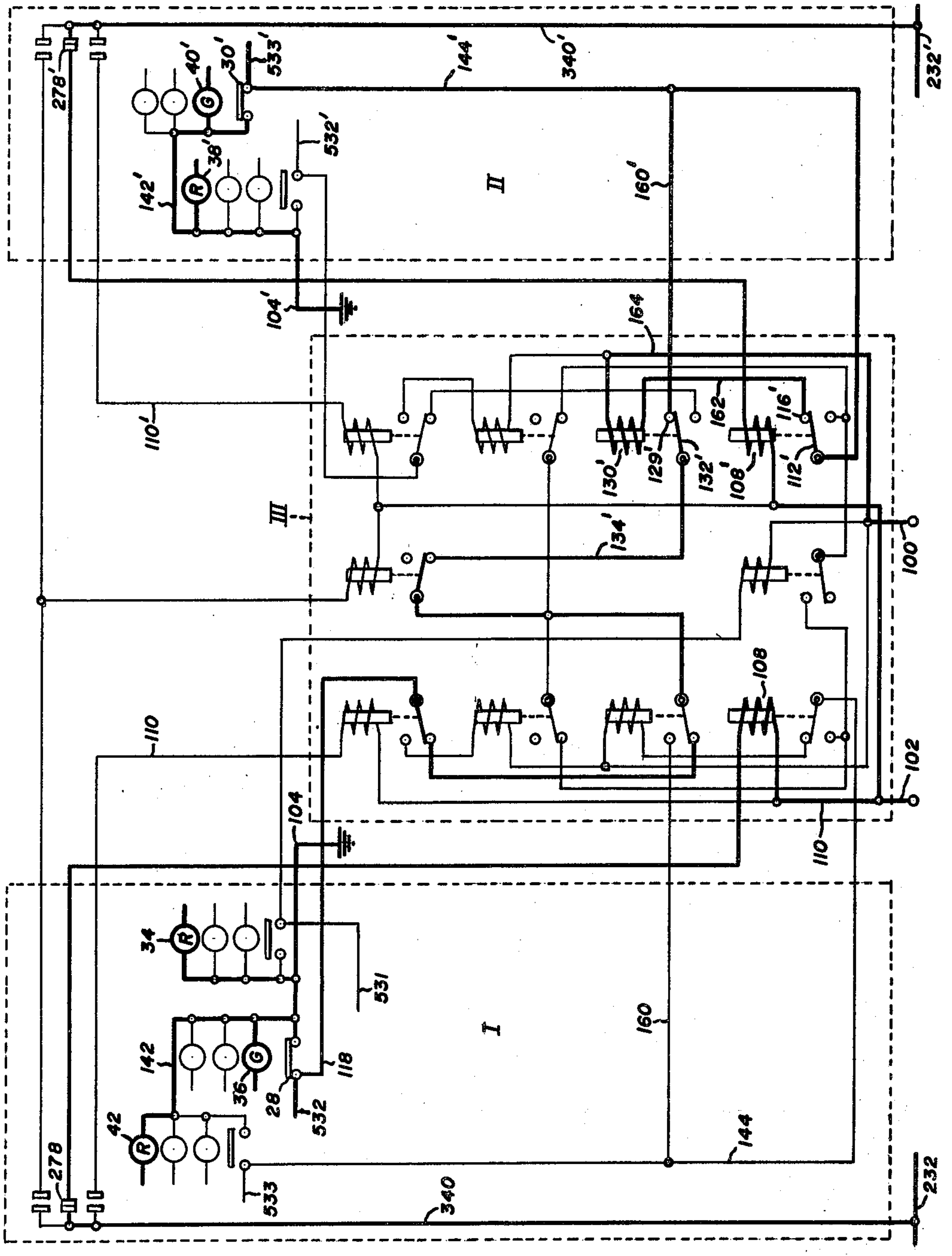
Figure 6:
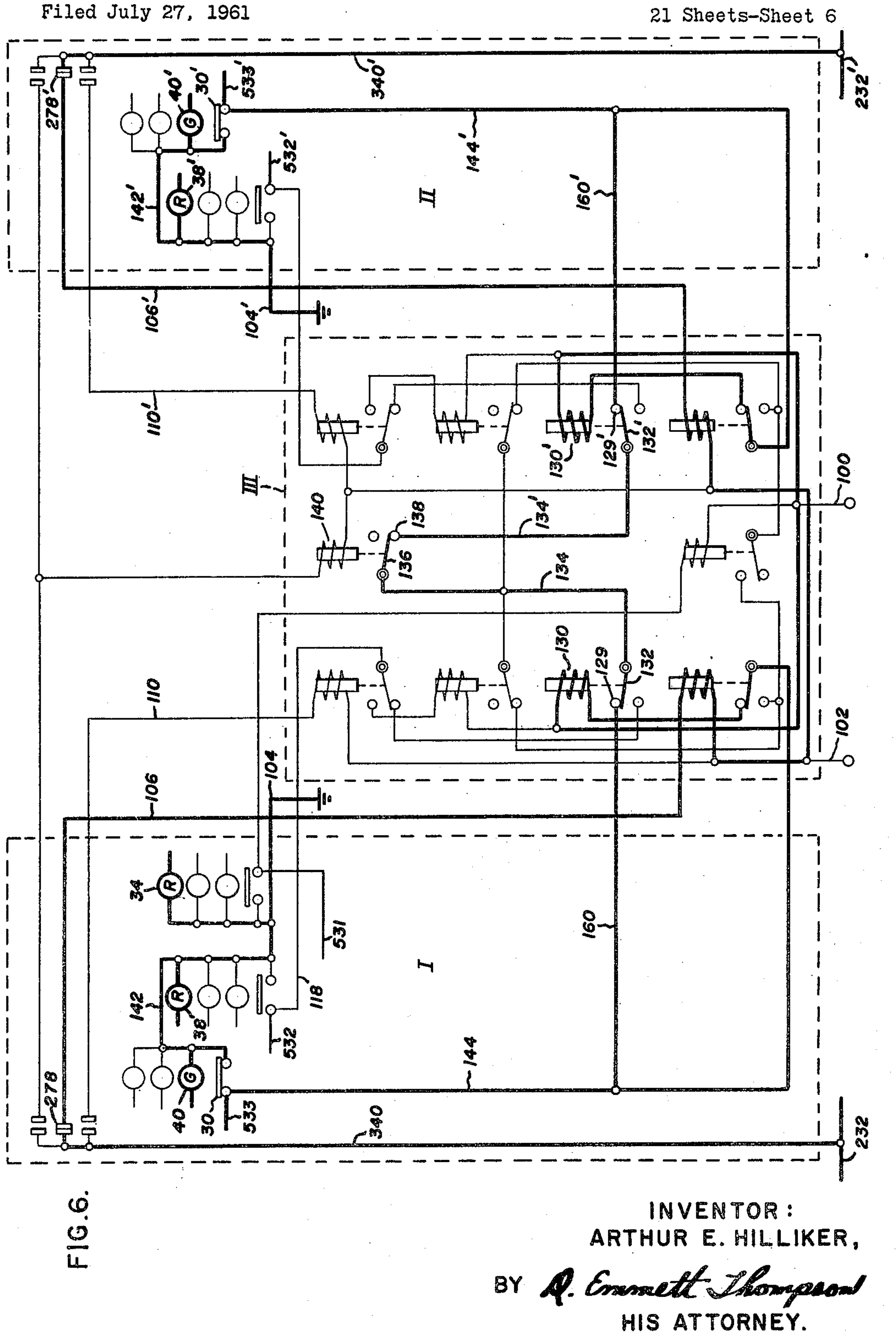

(1) Call on movement three (FIG. 4).
(2) Call on movement two (FIG. 5).
(3) Call on movements two and three (FIG. 6).

Figure 7:
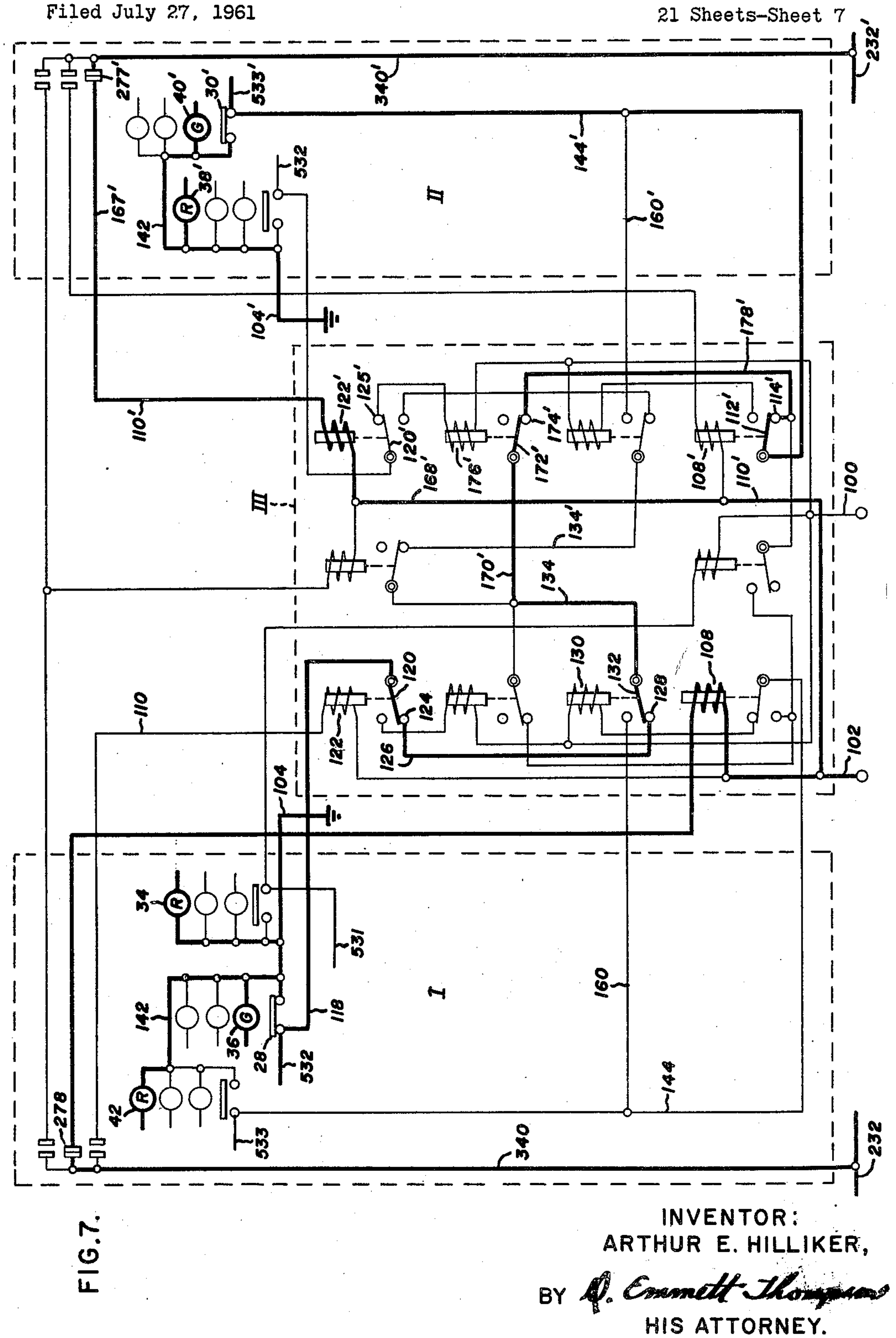

(B) Movements two and four have the right of way, (FIG. 7).

Figure 8:
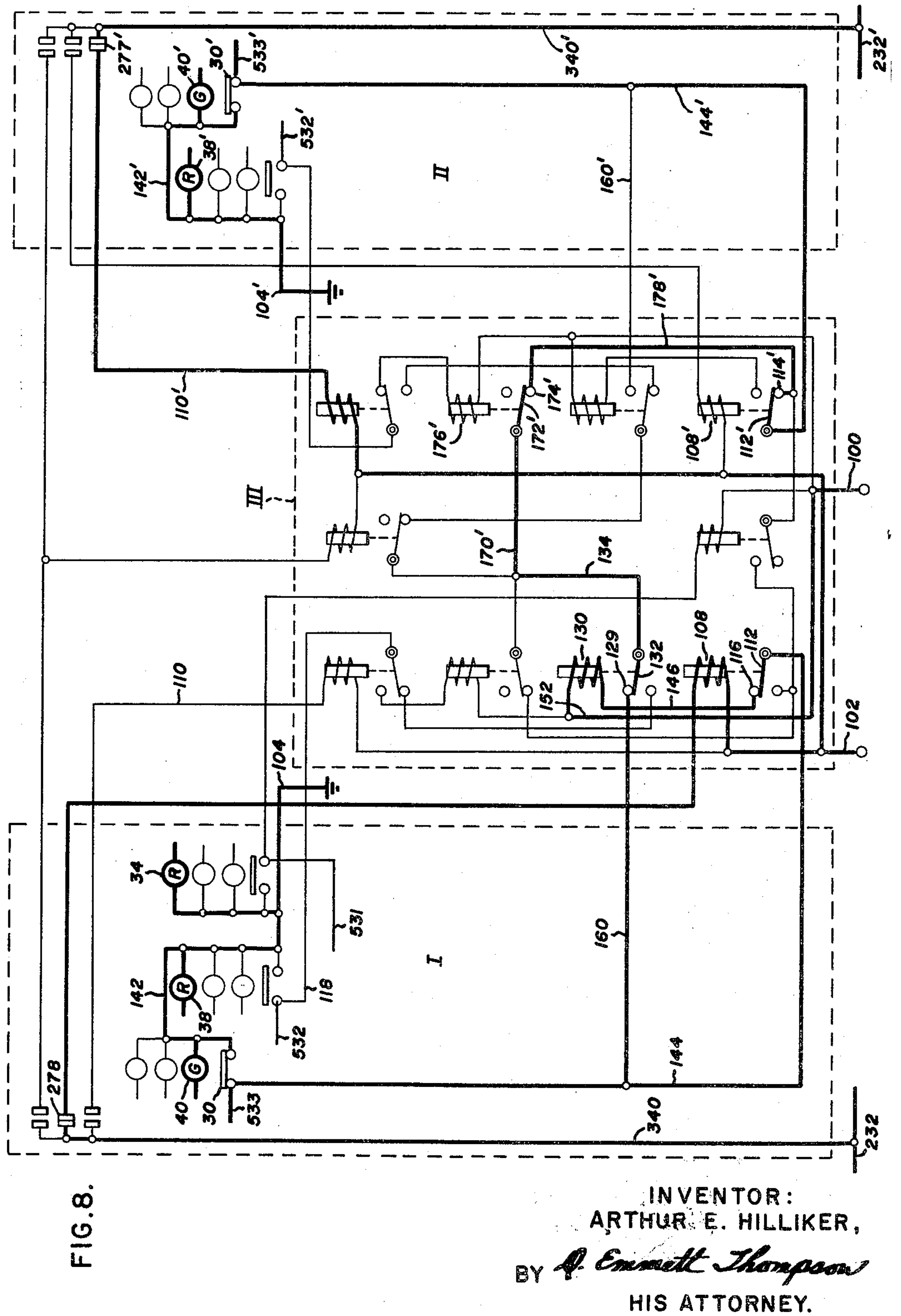
Figure 9:
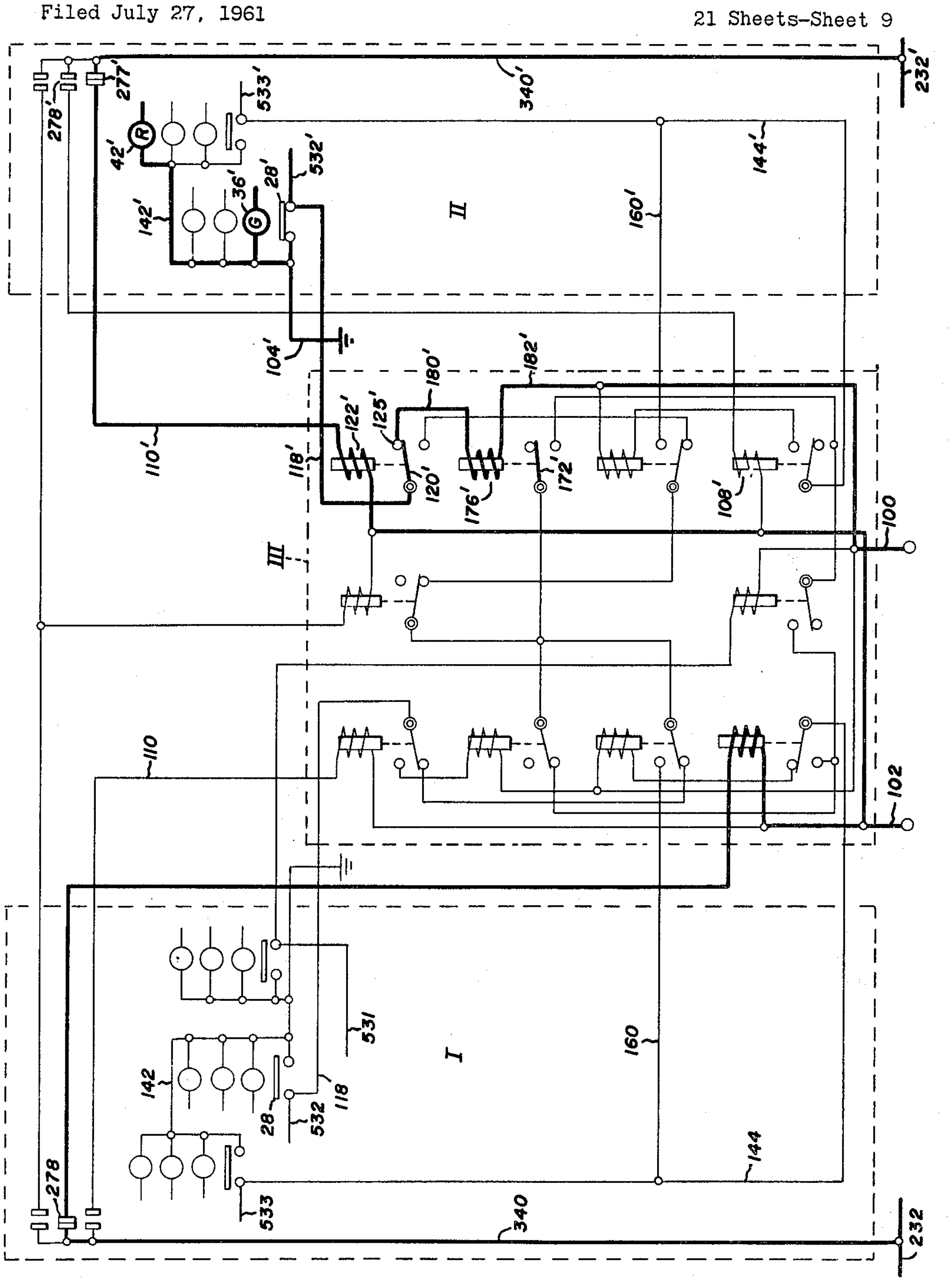
Figure 10:
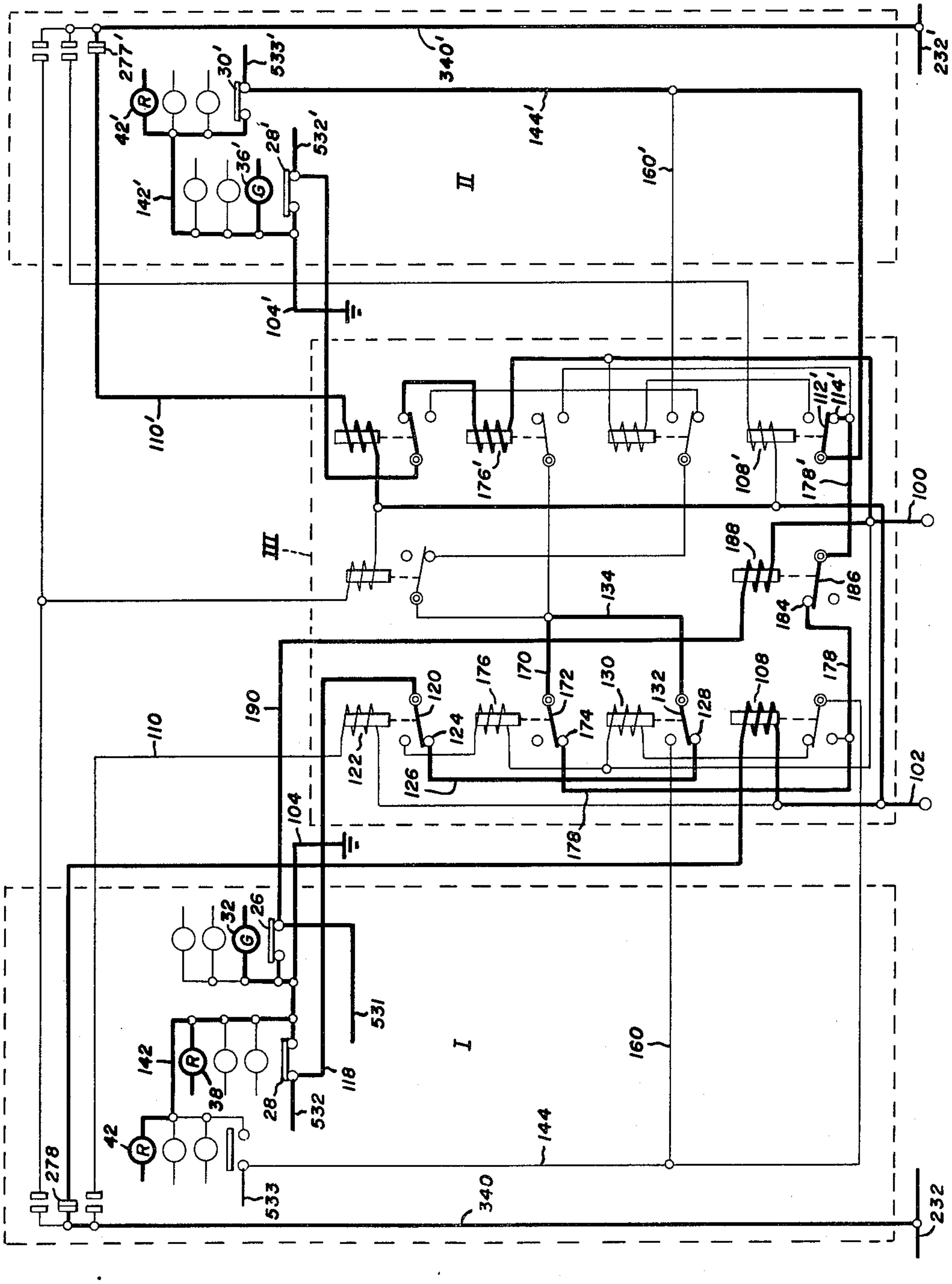
Figure 11:
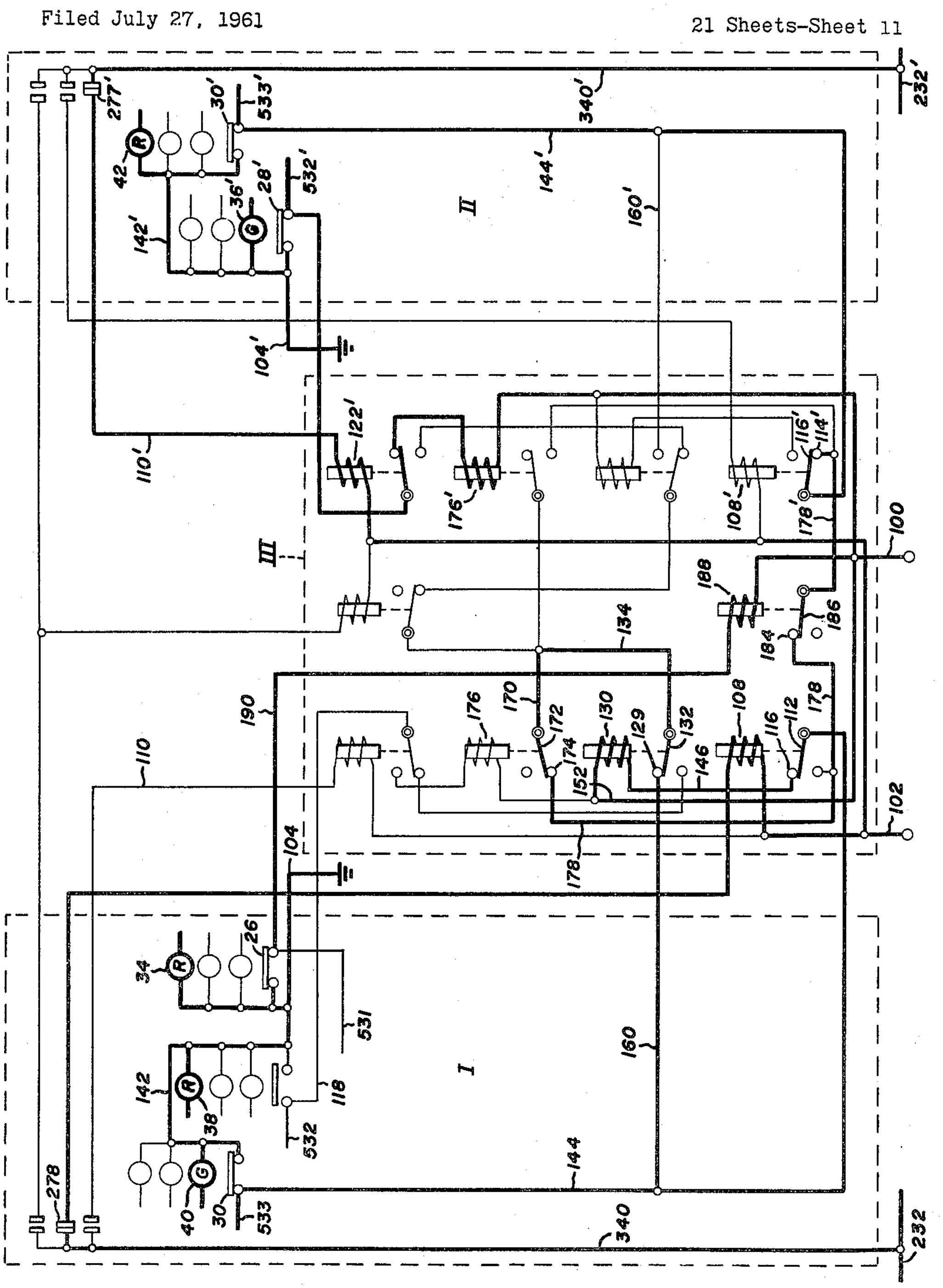

(1) Call on movement three (FIG. 8).
(2) Call on movement five (FIG. 9).
(3) Call on movement five, call on movement one (FIG. 10).
(4) Call on movement five, call on movement one, call on movement three (FIG. 11).

Figure 12:
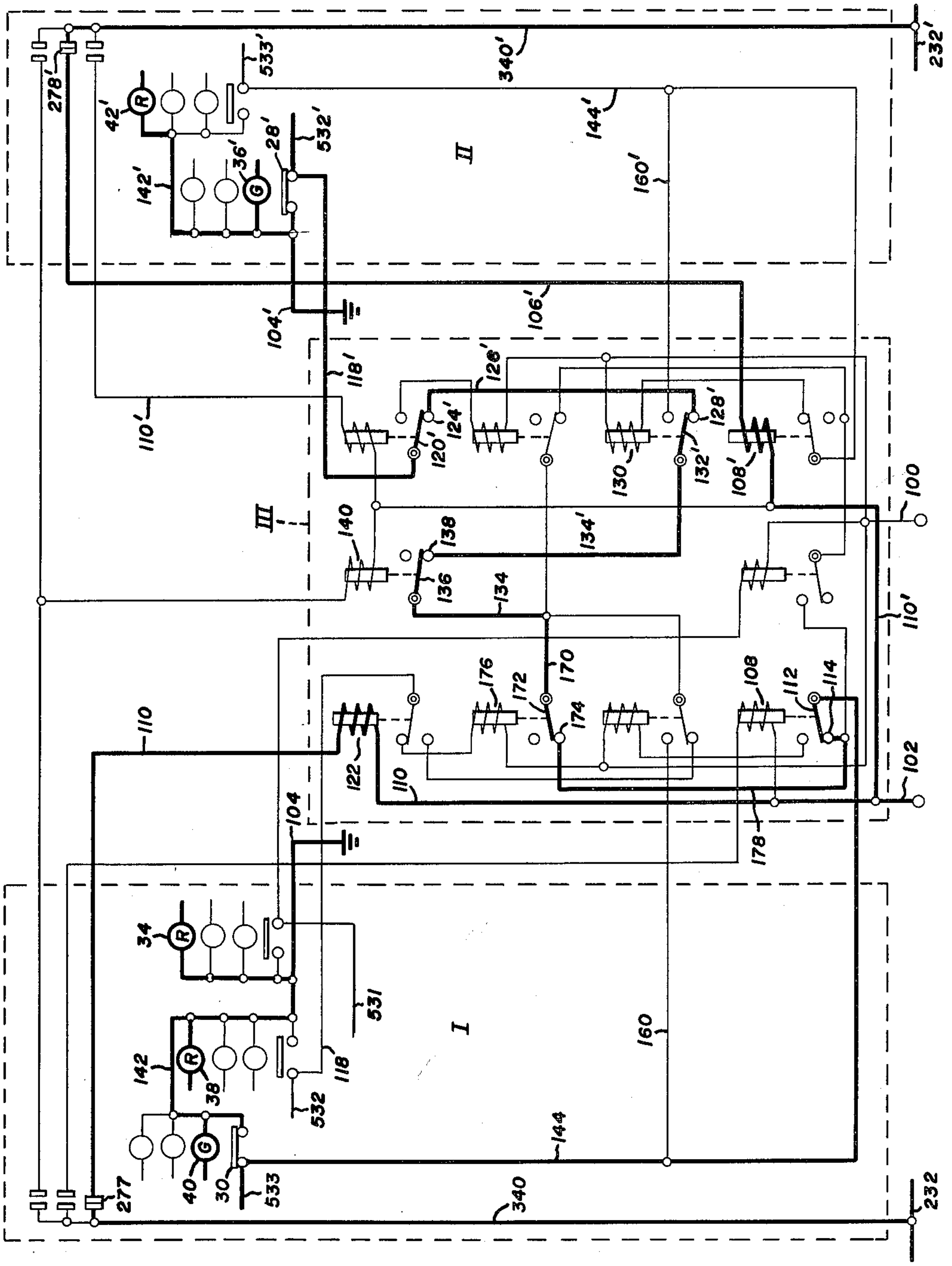

(C) Movements three and five have the right of way (FIG. 12).

Figure 13:
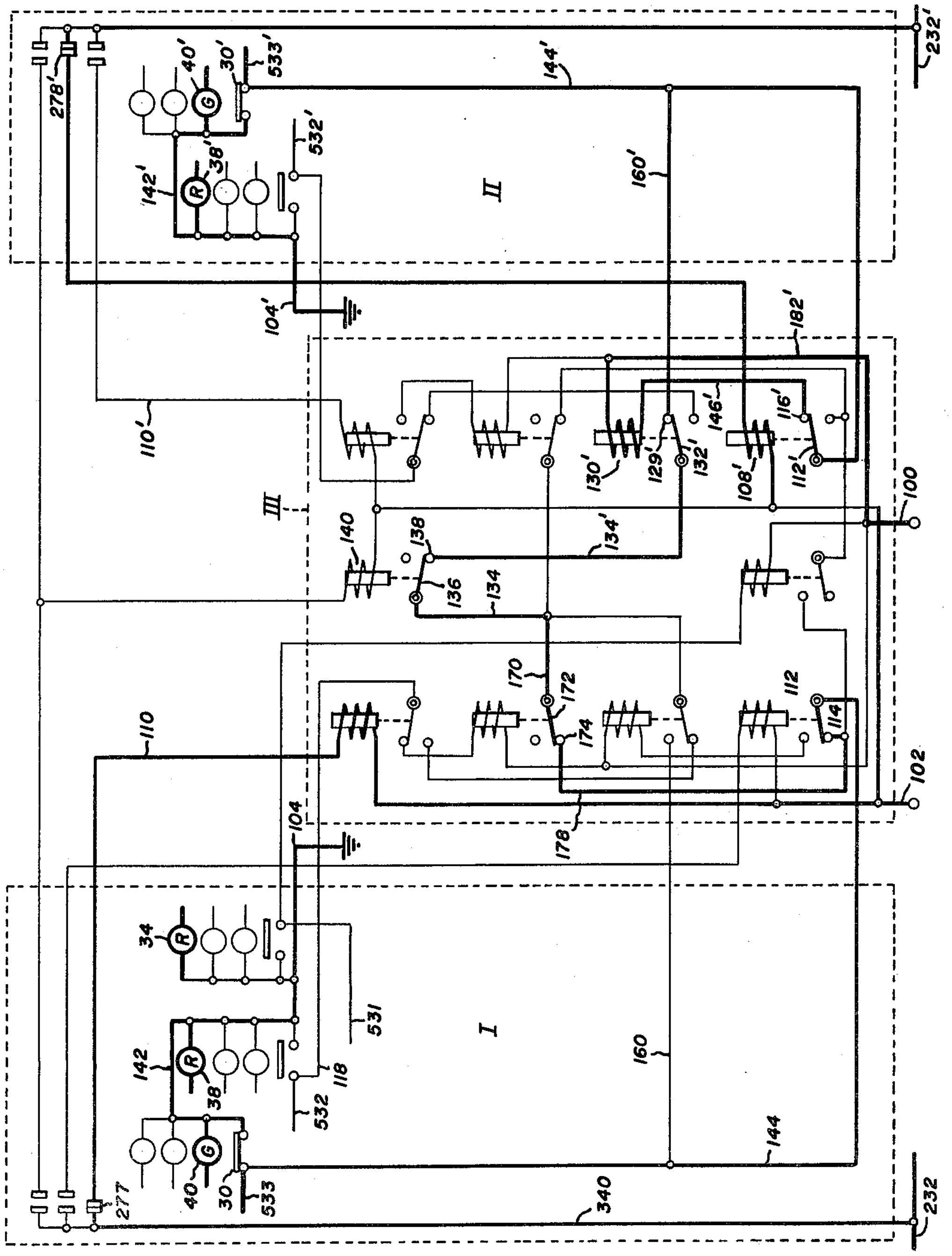
Figure 14:
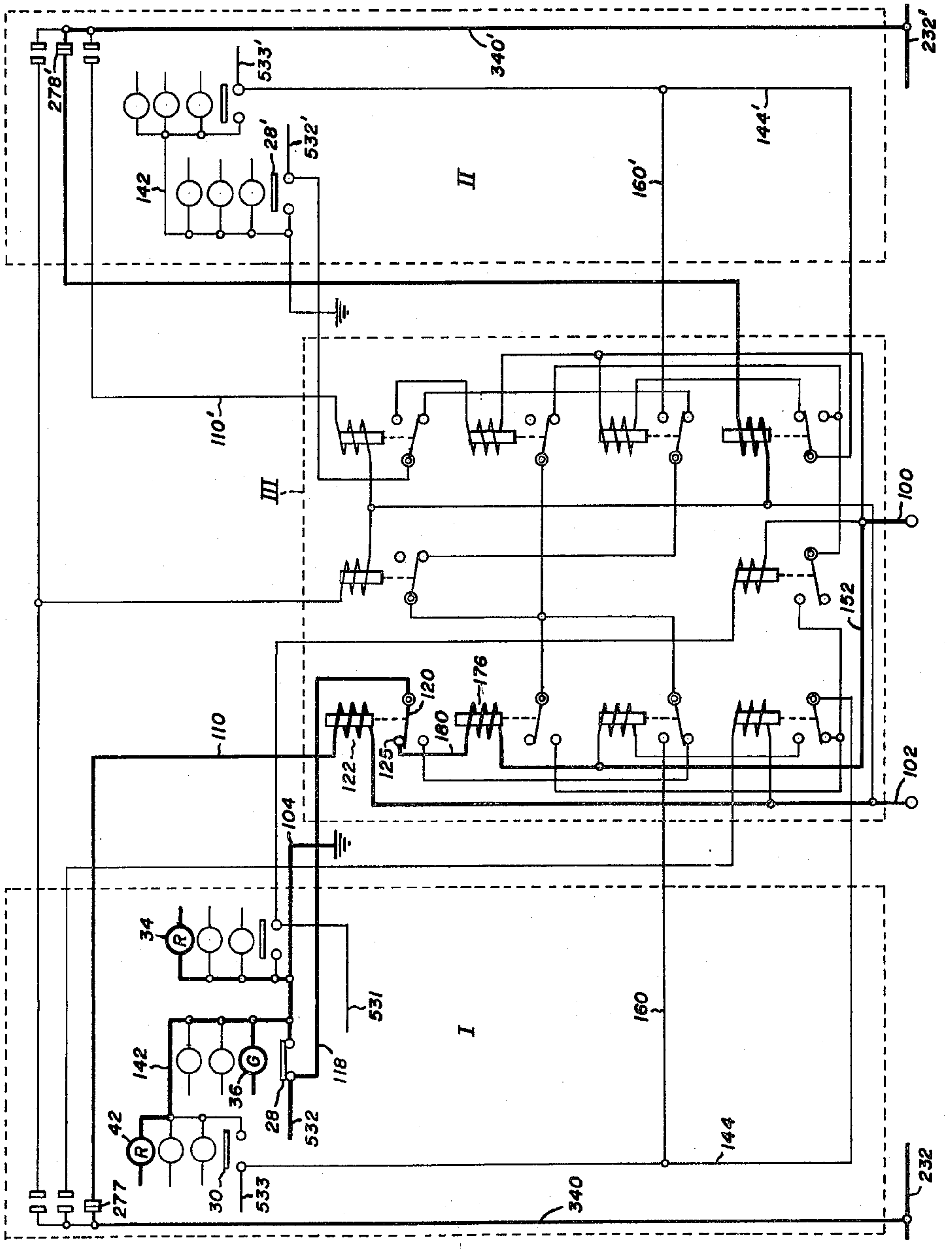
Figure 15:
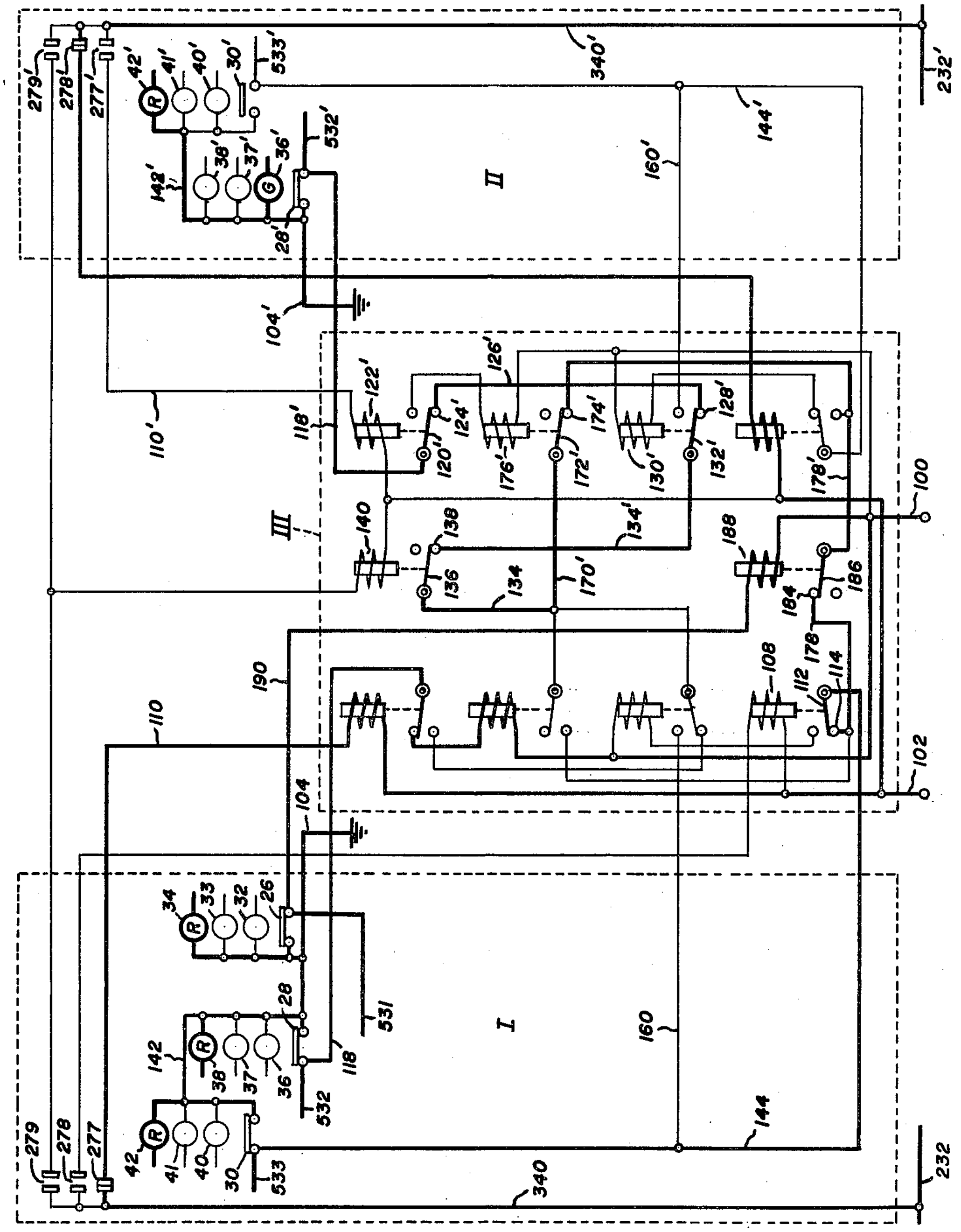
Figure 16:
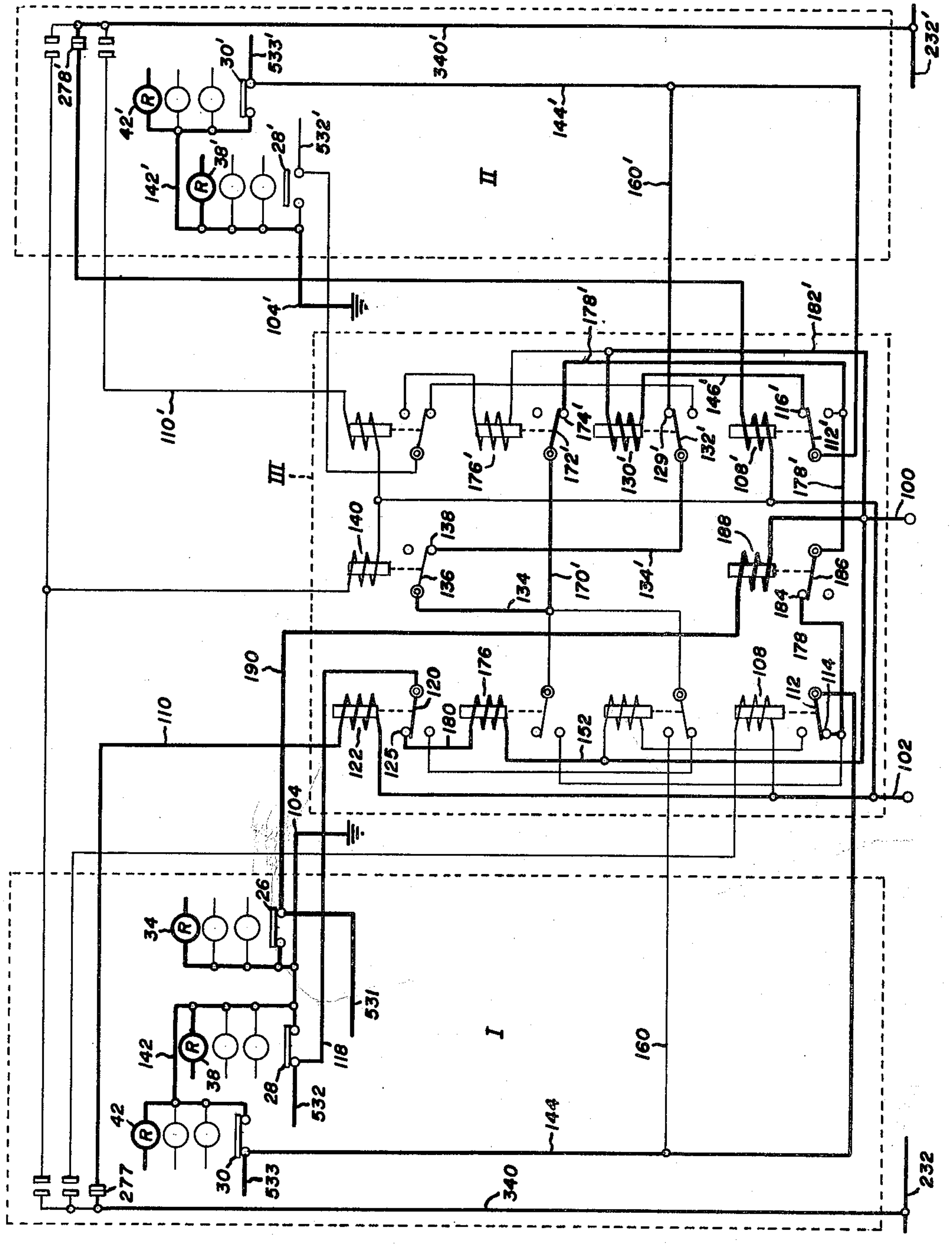

(1) Call on movement two (FIG. 13).
(2) Call on movement four (FIG. 14).
(3) Call on movement four, call on movement one (FIG. 15).
(4) Call on movement four, call on movement one, call on movement two (FIG. 16).

Figure 17:
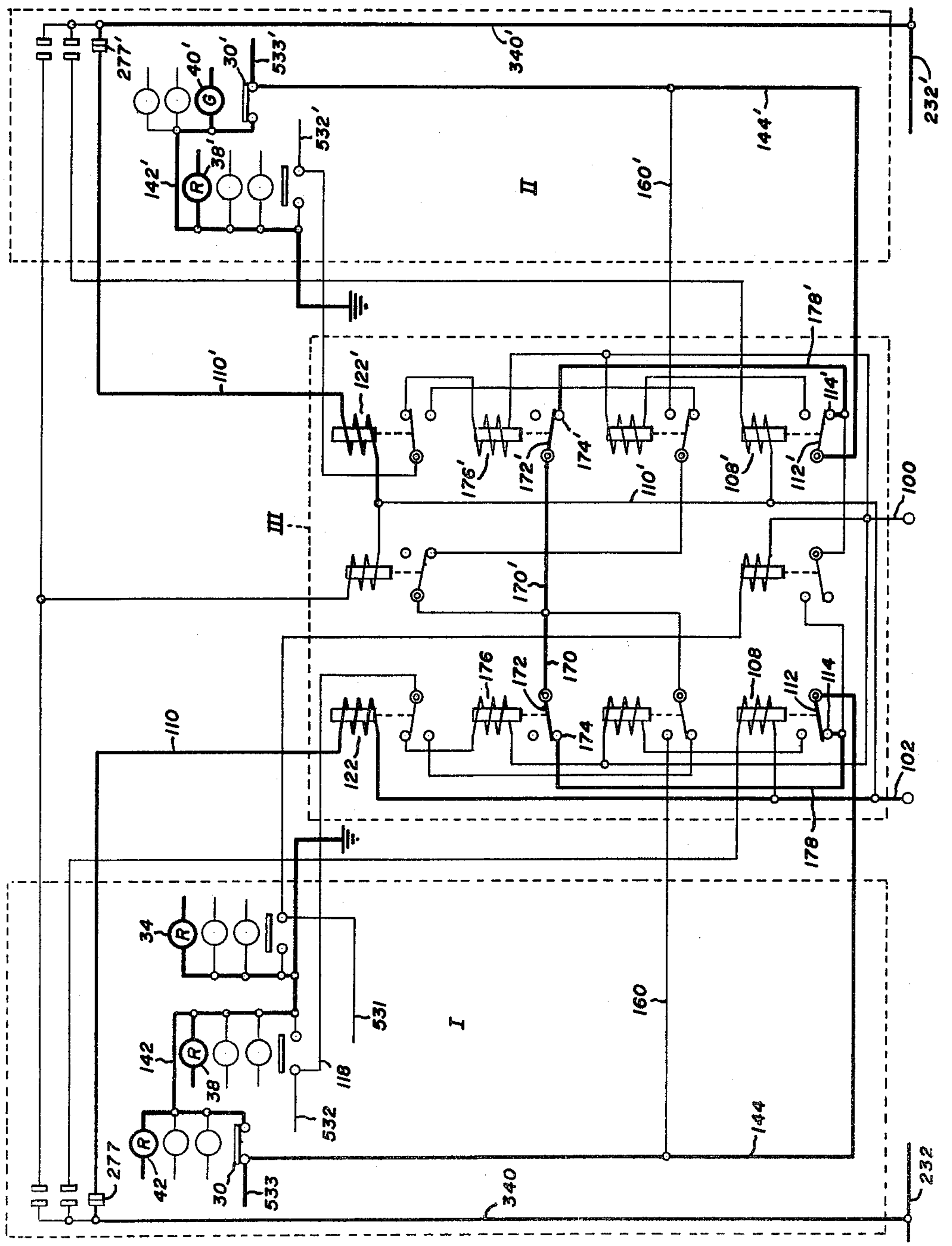

(D) Movements two and three have the right of way (FIG. 17).

Figure 18:
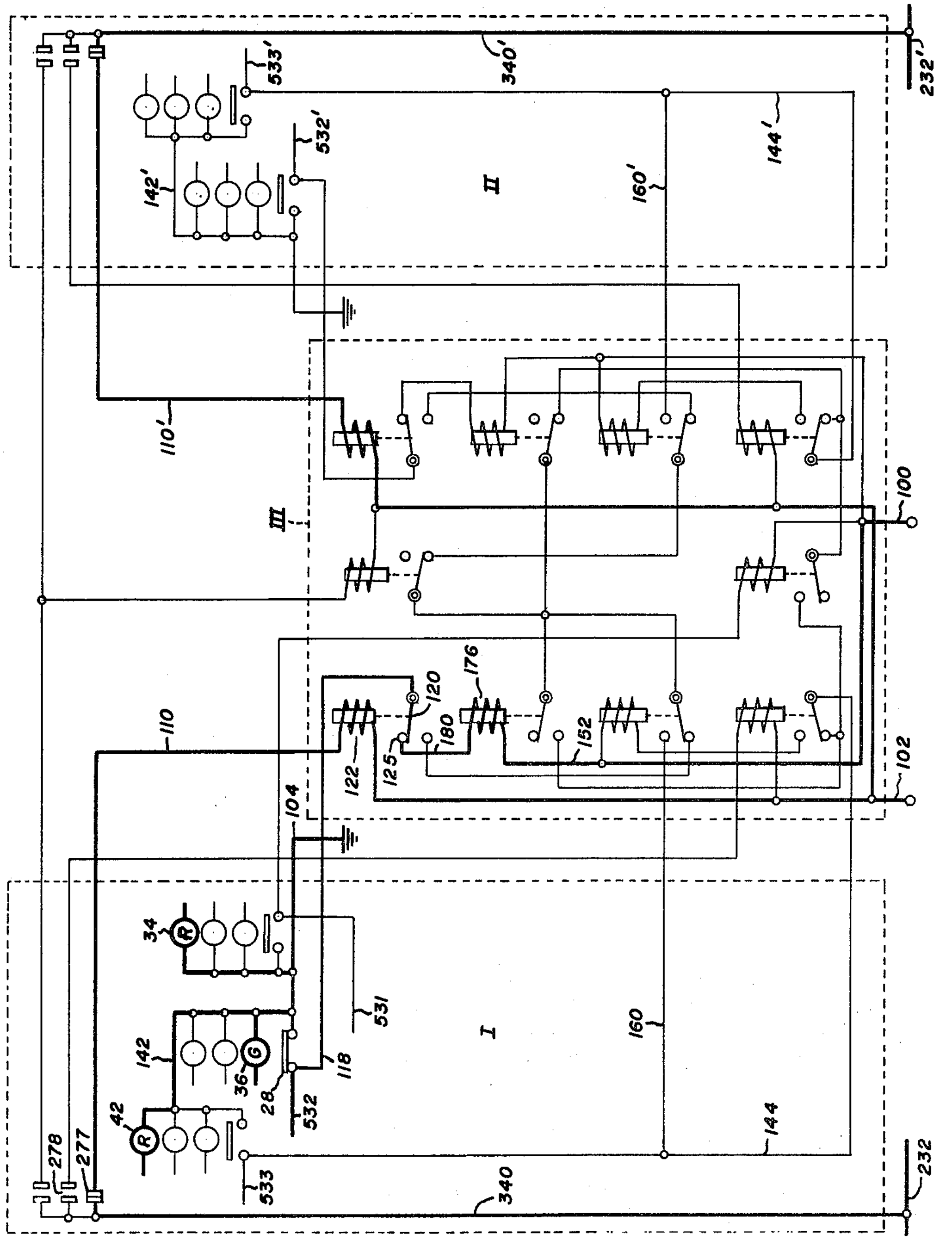
Figure 19:
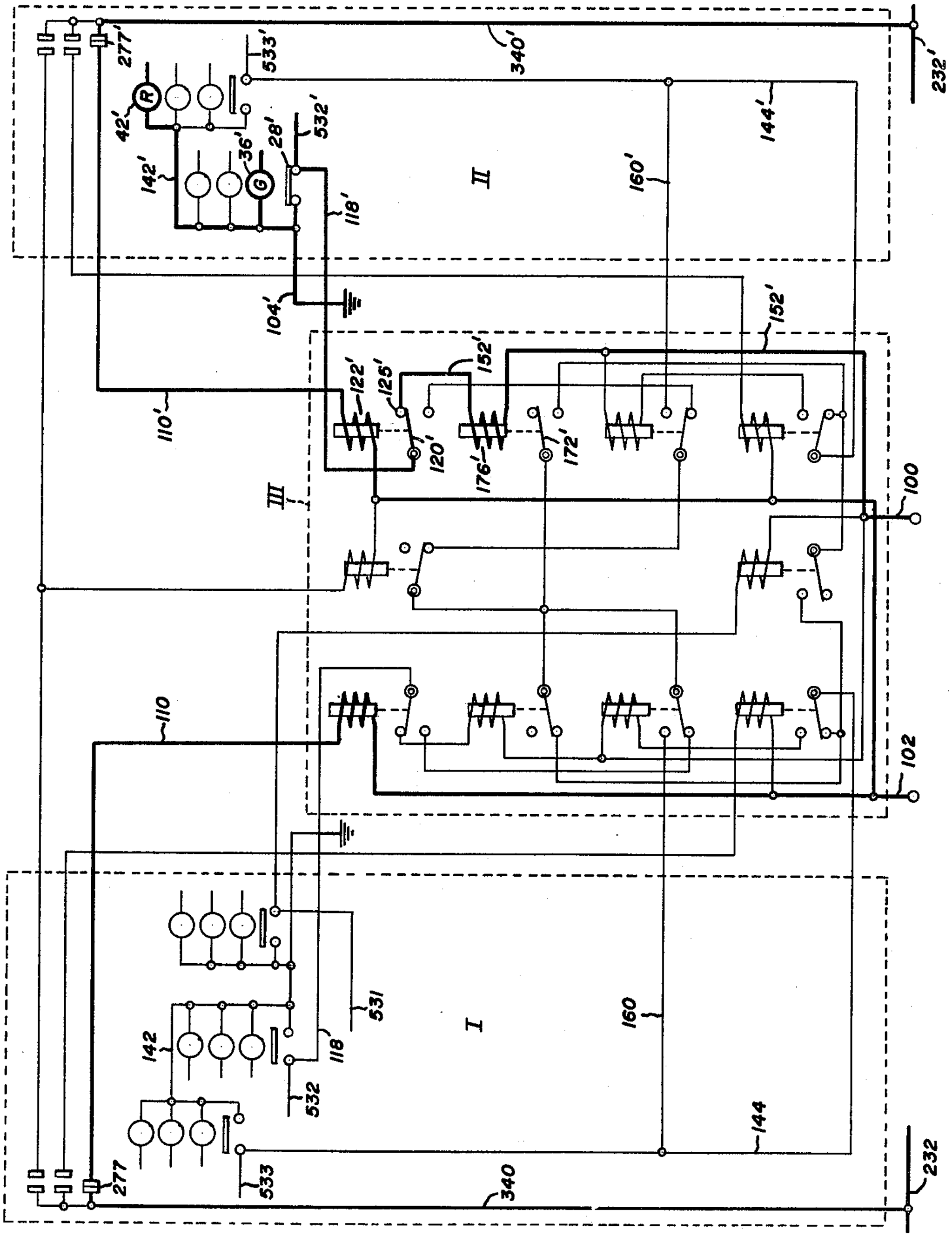
Figure 20:
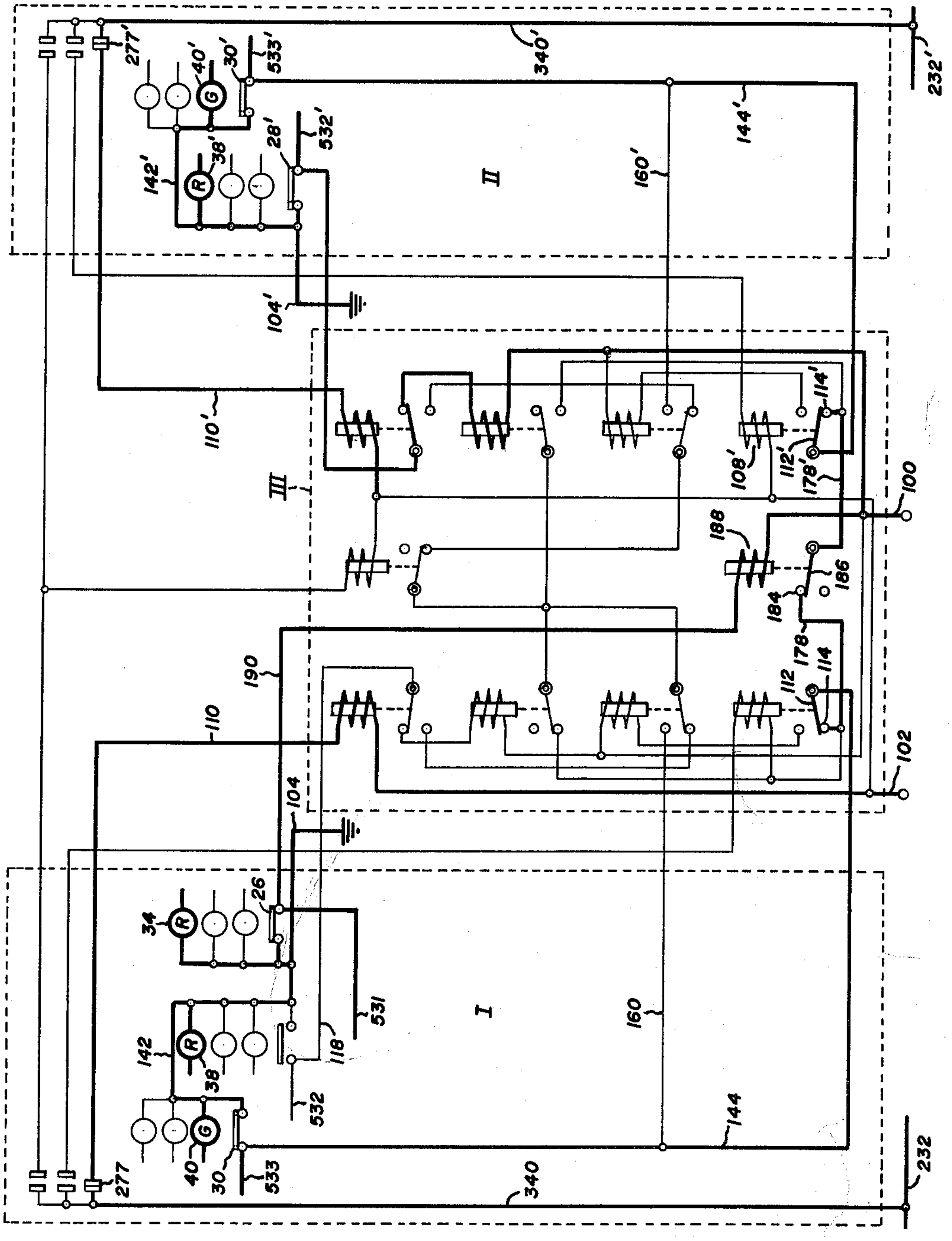
Figure 21:
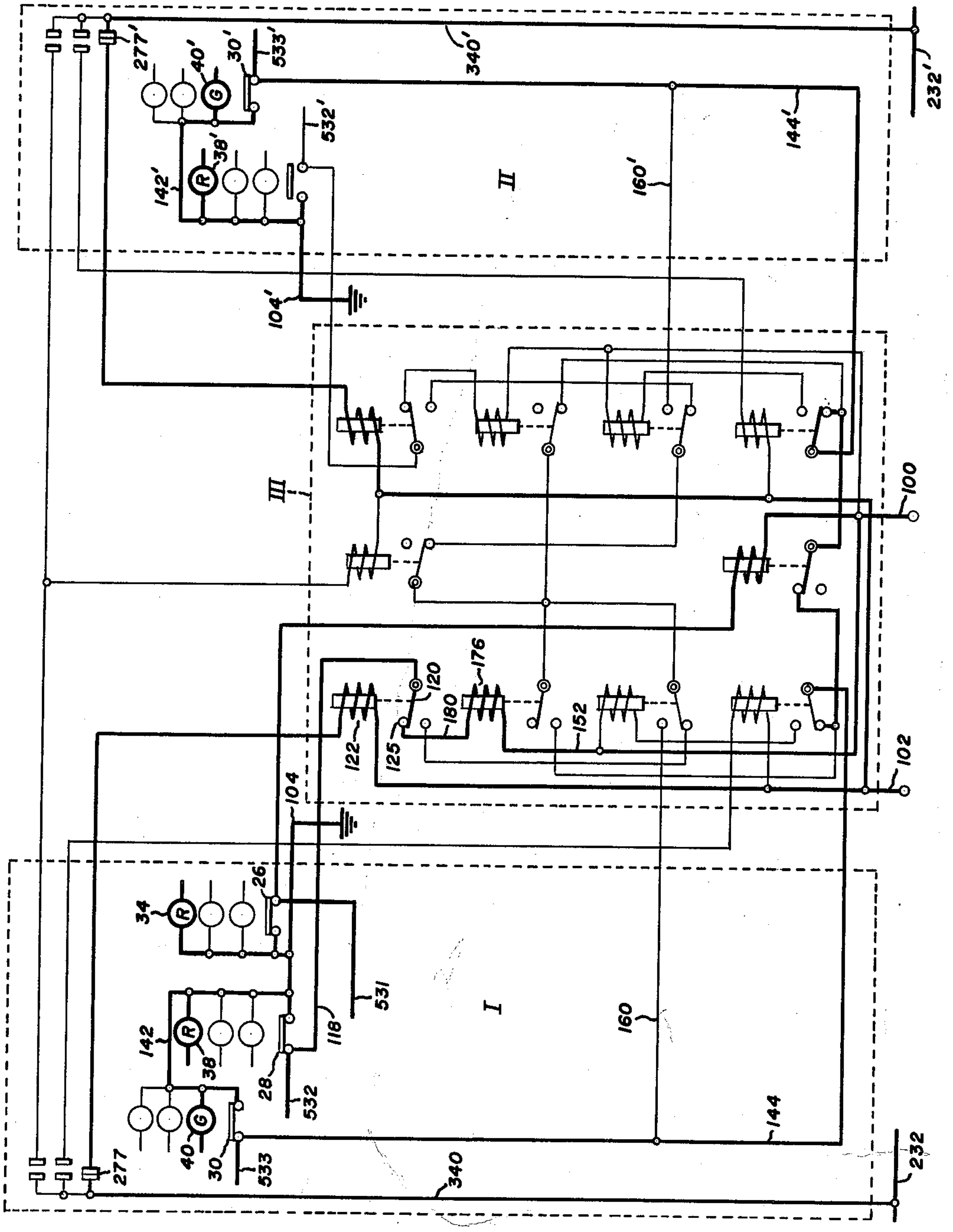

(1) Call on movement four (FIG. 18).
(2) Call on movement five (FIG. 19).
(3) Call on movement five, call on movement one (FIG. 20).
(4) Call on movement four, call on movement one (FIG. 21).

Referring to FIGURE 1, the intersection is made up of a main street "M" and a cross street "N." The main street "M" is provided with a traffic island "L" or the like on each approach formed so as to provide a lane for traffic turning left in the intersection off of the main street and onto the cross street. The cross street "N" has no such provision and the traffic movement thereon is merely straight through the intersection as is the traffic movement on the through lanes of the main street.

For purposes of reference, the arrows shown on FIGURE 1 are utilized to indicate the various traffic movements which are five in number. These movements are as follows: Arrows 21 indicate the movement of traffic on the through lanes of the cross street which movement is termed movement one. Arrow 22 is used to indicate movement two which is the left turn movement for traffic approaching the intersection from the right of FIGURE 1. Arrow 23 indicates movement three which is the left turn movement for traffic approaching the intersection from the left of FIGURE 1. Arrow 24 indicates movement four which is the straight through movement from the right hand approach of the intersection and arrow 25 indicates movement five which is the straight through movement for the left hand approach of the intersection. Hereinafter, movements one to five inclusive will be referred to by the reference numbers 21 to 25, inclusive.

These reference numerals correspond to the reference numerals in my co-pending application and in like manner a pair of full-actuated three-movement traffic controllers identified by Roman numerals I and II are shown positioned adjacent the intersection and operate in connection with a phase synchronizer unit identified by Roman numeral III to control the various movement of traffic through the intersection in accordance with the objects of this invention.

The controllers I, II and III operate in conjunction with the detector means for each traffic movement to control the signal means for each traffic movement. For purposes of illustration, such detection means are indicated by the boxes 26, 28, 28', 30 and 30' for the various movements and may be any suitable type of vehicle detection means. The detectors 26 will be wired in parallel so that a detection received on either approach to the intersection on the cross street "N" will serve to place a call on the controllers for transfer of the right of way signal display to the cross street "N."

Similarly, the signal means for the cross street are indicated by the circled letters G, A, and R and identified by the reference numerals 32 to 34 inclusive and in like manner, the signal means for the movements on the main street are identified by the reference numerals 36 to 42 inclusive, the signal means associated with the traffic movements identified by the arrows 22 and 25 having the reference numerals primed, while the signal means associated with the movements identified by the arrows 23 and 24 have the reference numerals unprimed.

As will be obvious, traffic movement 21 conflicts with all of the movements of traffic on the main street so that when the traffic movement 21 has received the right of way, traffic movements 22, 23, 24 and 25 must receive a stop indication. However, traffic movements 22 and 24 are non-conflicting as are traffic movements 23 and 25. Further, traffic movements 22 and 23 are non-conflicting as are traffic movements 24 and 25. However, traffic movements 22 and 25 as well as 23 and 24 are conflicting.

As is more particularly set forth in my co-pending application, the signal means associated with each movement are energized in accordance with the order of actuation with the detection means associated with each movement for a predetermined but extendable time interval up to a maximum. In this connection, the letter G is used to represent a Green or a Go or Proceed signal, the letter A an amber or clearance signal, and the letter R a red or stop signal and the "signal display sequence" comprises the successive energization of the proceed, clearance and stop signals.

Referring now to FIGURE 2, a portion of the full-actuated, three-movement traffic controller I is shown to the left of the figure while a portion of a similar traffic controller identified by II is shown to the right of the figure. The phase synchronizer-unit identified by III is shown in the dashed line box between the two controllers and is interconnected with the controllers as shown. The controllers I and II are identical in all respects to the controllers shown in FIGURES 1 and 1A of my application, Serial No. 51,052 and accordingly only the necessary portions thereof have been shown in FIGURES 2 to 21 inclusive. The same elements in each controller are provided with the same reference numeral for ease of description and the reference numerals applied to the elements of controller II are primed. These elements include a hot power supply line 232 which is connected by the line 340 through the added cam contacts 277, 278 and 279 of the cam unit to the various elements in the phase synchronizer III. In addition, the signal means 32 to 42 inclusive in both controllers are connected to the respective cams (not shown) as more fully set forth and shown in application Number 51,052 to energize the signal means.

The cam contacts 277 and 277' are arranged to be normally closed by the cam unit except when controller I or controller II are resting in the extension interval for the movements 24 and 25 respectively, in which case the cam contacts 277 and 277' will be open. In like manner, the cam contacts 278 and 278' are normally closed except when the controllers I and II are resting in the extension interval for the movements 22 and 23 in which case the cam contacts 278' and 278 are open. Conversely, the cam contacts 279 and 279' are normally open but are closed when the controllers I and II are resting in the extension interval for movement 21. These cam contacts are arranged to be opened and closed in the fashion just described in order to set the phase synchronizer III to effect the desired synchronization, as will be more fully hereinafter described.

As is seen in FIGURE 2, each of the detectors 26, 28, 28', 30 and 30' has a lead extending from the contact of the detector opposite the grounded contact. This lead for the detector 26 is numbered 531 similarly to the numbering for this lead in my co-pending application Number 51,052 and the leads for detectors 28 and 30 both primed and unprimed are numbered 532 and 533 both primed and unprimed respectively. The purpose of these leads, as is more fully disclosed in my co-pending application 51,052 and the co-pending application of Jeffers, Number 47,492, is to initiate the operation of the controller when the detector is actuated through the circuitry more fully disclosed in those applications. Accordingly, as will be more fully disclosed hereinafter, the main purpose of the phase synchronizer unit III is to place the detectors for non-conflicting movements on the main street in parallel with each other to thereby synchronize the operation of the controller by the leads 531, 532, 532', 533, and 533' in response to detector actuations received on either detector means associated with the non-conflicting movements.

The phase synchronizer unit III comprises a twelve volt power supply including hot line 100 and a common or return line 102. The phase synchronizer is made up of ten relays, each having a pair of fixed contacts and an armature contact, moveable between the fixed contacts upon the energization of the coil of each relay. These relays and their associated contacts will be identified in connection with the description of FIGURES 3 to 21 inclusive.

As above set forth, the purpose of the synchronizer unit III is to synchronize the detector actuations of any two non-conflicting main street movements having the right of way signal display simultaneously. This synchronization may be stopped and reestablished as will be hereinafter described, if vehicle detector actuations are received on conflicting main street movements. The phase synchronizer, however, will not permit the right of way signal display to be changed on a main street movement which has had a prior detector actuation if there is a main street movement which is non-conflicting and which has additional or repeated actuations during and after the actuation of the detection means on one of the approaches of the cross street. As is described in application Serial Number 51,052, the total time interval during which the right of way is displayed to any of the movements will be controlled by the controllers I and II so as to give a variable but predetermined maximum right of way time interval for each movement. As is described in my co-pending application 51,052, each of the controllers function independently as a result of vehicle actuation of the detector means associated with the main street movements. The phase synchronizer, however, interconnects the two controllers so that once two non-conflicting movements on the main street have received actuation of their associated detection means, the detection means will be synchronized so that thereafter actuation of only one of the two now synchronized detection means will serve to operate both controllers so as to continue to display the right of way to both non-conflicting movements for the maximum time interval.

*Condition A*

By way of example and referring now to FIGURE 3, let it be assumed that movements 24 and 25 are receiving the right of way due to successive actuations of the detectors 28 and 28'. The controllers I and II are now resting in this condition with the proceed signals 36 and 36' being energized as is indicated by the heavy lines. The detectors 28 and 28' are shown in the closed position for purposes of illustration only and the detectors 28 and 28' are synchronized so that an actuation of either one of the detectors serves to place a call on both controllers I and II for an extension of the proceed signal display to the movements 24 and 25. This synchronization circuit comprises the lead 532 in controller I, line 118, armature 120 of relay 122, fixed contact 124, line 126, which is connected to a lower fixed contact 128 of a relay 130 and through the armature 132 of relay 130 to line 134 which is connected to the armature 136 and lower fixed contact 138 of relay 140 to line 134' which is connected to the armature 132' of relay 130' and lower fixed contact 128' to line 126' through lower fixed contact 124' and armature 120' of relay 122' to line 118' which is connected through lead 532' to controller II. Accordingly, since the movements 24 and 25 are non-conflicting, this synchronization will be maintained until a call is received on movements 22 or 23 of the main street.

With the controllers I and II resting in this condition, the contacts 278 and 278' are closed by the cam units in the respective controllers so as to complete circuits comprised of lines 232, 232', 340, 340', cam contacts 278, 278', line 106, 106', coils of relays 108, 108', and lines 110, 110', which are connected to the common return line 102, thus energizing the relays 108, and 108'. The energization of the relays 108 and 108' moves their respective armatures 112 and 112' upwardly from the lower fixed contacts 114 and 114' into engagement with the upper fixed contacts 116 and 116' for a purpose to be hereinafter described.

*Condition A (1)*

When a call is received on detector 30 associated with movement 23, the phase synchronizer will be as shown in FIGURE 4. In that figure, the actuation of the detector 30 completes a circuit from its associated cam unit from the proceed signal 40 to line 142 which is connected to the ground line 104 to energize the signal 40. Also, closing of the detector 30 completes a circuit from ground line 104 through the detector 30 to line 144 which is connected to the armature 112 of relay 108 and through the fixed contact 116 to line 146 which is connected through the coil of relay 130 to line 152 to the hot line 100, thus energizing the relay 130. The energization of relay 130 causes its armature 132 to move upwardly from its lower fixed contact 128 and into engagement with upper fixed contact 129, thereby completing a circuit from the lead 533 in controller I, to line 144 through line 160, fixed contact 129, armature 132 to line 134, which is connected by the circuit shown in FIGURE 3 to lead 532′ of controller II. Accordingly, the energization of relay 130 broke the circuit described and shown in FIGURE 3 for the synchronization of the detectors 28 and 28′ and established a synchronization between detectors 30 and 28′ for non-conflicting movements 23 and 25, as shown in FIGURE 4.

*Condition A (2)*

Referring now to FIGURE 3 and FIGURE 5, let it now be assumed that while the circuit is in the condition shown in FIGURE 3, a call is received on detector 30′ associated with movement 22. This call completes a circuit from the grounded line 104′ to line 142′ to the actuated or closed detector 30′ to line 144′, armature 112′, fixed contact 116′ of relay 108′ to line 162 which is connected through the coil of relay 130′ to line 164 which is connected to the hot line 100, thus energizing the relay 130′. The energization of the relay 130′ breaks the synchronization between detectors 28 and 28′ as shown in FIGURE 3 and completes a circuit shown in FIGURE 5 from the lead 533′ in controller II, line 144′ through line 160′ to the upper fixed contact 129′ and armature 132′ of relay 130′ to line 134′ and through the balance of the circuit shown in FIGURE 3 to lead 532 in controller I, thereby synchronizing the detectors 28 and 30′ of non-conflicting movements 24 and 22.

*Condition A (3)*

Referring now to FIGURE 6, if the detectors 30 and 30′ are actuated either successively or simultaneously, the condition of the unit will be as shown in FIGURE 6. The actuation of the detector 30 as described in connection with FIGURE 4 serves to energize the relay 130 through the circuit described in connection with the description of FIGURE 4 and the actuation of detector 30′ serves to energize the relay 130′ as described in connection with the description in FIGURE 5. Consequently, and referring now to FIGURE 6, when both detectors 30 and 30′ are actuated, a synchronizing circuit is established from the lead 533 in controller I through the line 144, line 160, contact 129 and armature 132 of relay 130, line 134, armature 136, and contact 138 of relay 140, line 134′, armature 132′, and contact 129′ or relay 130′ to line 160′ and line 144′ which is connected to the lead 533′ in controller II, thus synchronizing the detectors 30 and 30′ for the non-conflicting movements 22 and 23.

*Condition B*

Referring now to FIGURE 7, let it be assumed that the detectors 28 and 30′ have been actuated either successively or simultaneously (for purposes of illustration, the detectors are shown as both being actuated). As discussed in connection with FIGURE 3, the actuation of detector 28 has caused the controller I to cycle to the position wherein the cam contacts 278 are closed thus energizing the relay 108 through the circuit discussed in connection with FIGURE 3. The closing of the detector 30′, however, has caused the controller II to cycle to the position where its cam contacts 277′ are closed then completing a circuit from the hot line 232′, line 340′, closed contacts 277′, line 167′ through the coil of relay 122′ to line 168; line 110′ which is connected to the common return line 102 thus energizing the relay 122. The energization of the relay 122′ causes its armature 120′ to move upwardly into engagement with the fixed contact 125′ thus breaking the circuit shown and described in FIGURE 3 for synchronizing the detectors 28 and 28′. Consequently, a synchronization circuit is established from the lead 532 in controller I through line 118, armature 120, and contact 124 of relay 122, line 126, contact 128 and armature 132 of relay 130 to line 134 to line 170′, which is connected through the armature 172′ and lower fixed contact 174′ to a relay 176′ to line 178′ and through the fixed contact 114′ and armature 112′ of relay 108′ to line 144′ which is connected to the lead 533′ in controller II, thereby synchronization of the detectors 28 and 30′ for the non-conflicting movements 24 and 22. Accordingly, this synchronization will be maintained until a call is received on movement 25 which conflicts with movement 22 or on movement 23 which conflicts with movement 24.

*Condition B (1)*

If the detector actuation takes place on detector 30, the circuit will be in a condition shown in FIGURE 8. In FIGURE 8, the closing of detector 30 has completed a circuit from the grounded line 104 through the closed detector 30 through line 144, armature 112 and contact 116 of relay 108, line 146, coil of relay 130 to line 152 which is connected to the hot power line 100 thus energizing the relay 130. The energization of the relay 130 causes its armature 132 to move upwardly into engagement with the fixed contact 129 thus establishing a synchronizing circuit between detectors 30 and 30′ comprising lead 533, line 144, line 160, contact 129, armature 132, line 134, line 170′, armature 172′, and contact 174′ of relay 176′, line 178′, contact 114′, and armature 112′ of relay 108′ to line 144′ which is connected to the lead 533′ in controller II.

*Condition B (2)*

If, however, with the circuit in the condition shown in the FIGURE 7, a call is first received on detector 28′ associated with the movement 25, the condition of the circuit will be as shown in FIGURE 9. In that figure, the actuation of the detector 28′ completes a circuit from the grounded line 104′ through the detector 28′, line 118′, armature 120′, and fixed contact 125′ of relay 122′ to line 180′ through the coil of relay 176′ to line 182′ which is connected to the hot power supply line 100 thus energizing the relay 176′. The energization of the relay 176′ in turn breaks the synchronization circuit shown in FIGURE 7 through the armature 172′ of relay 176′ between the detectors 28 and 30′ and allows the controller II to cycle by virtue of the actuation of the detector 28′, to present right of way signal display movement 25, the detectors 28′ and 28 will be synchronized through the circuit shown and described in connection with FIGURE 3. Due to the fact that the cycling of the controller II will open the cam contacts 277′ shown in the closed condition in FIGURE 9, and will close the contacts 278′, which in turn will de-energize the relay 122′ and energize the relay 108′. As will be obvious, the disengagement of the relay 122′ permits the synchronization circuit between the detectors 28 and 28′ to be established as shown in FIGURE 3.

*Condition B (3)*

If, however, with the circuit in the condition shown in FIGURE 9, a call is received on the detector 26 for the movement 21 on the cross street "N" before the controller II has cycled from the position shown in FIGURE 9 wherein the right of way signal is being displayed to the movement 22, the movements 24 and 22 will maintain their synchronization for the predetermined maximum time interval. The condition of the circuit for this case is shown in FIGURE 10. In that figure, the synchronization circuit between the lead 532 for movement 24 associated with the detector 28 comprises line 118, armature 120, and contact 124 of relay 122, line 126, contact 128 and 132 of relay 130, line 134, line 170, armature 172 and contact 174 of relay 176, line 178, contact 184 and armature 186 of relay 188, line 178', contact 114' and armature 112' of relay 108' to line 144' which is connected to the lead 533' of controller II. This synchronization circuit just described, however, was made possible by the closing of the detector 26 for the cross movement 21 which caused the energization of the relay 188 through the circuit comprising grounded line 104, closed detector 26, line 190 through the coil of relay 188 to the coil of relay 188 to the hot line 100. As set forth in connection with FIGURE 9, the closing of the detector 28' has completed a circuit to energize the relay 176' but the actuation of the detector 26 and consequent energization of the relay 188 establishes a synchronization between the detector 28 and 30' for the non-conflicting movements 24 and 22 on the main street.

As will be obvious, from the description from FIGURE 10, the synchronizer unit III has operated to maintain the right of way signal display on the non-conflicting main street movements 22 and even though a demand has been placed on the controller to present the right of way signal display to the cross street. As set forth in my prior application Number 51,052, if such a situation occurred, the invention of that application would have functioned to present or change the right of way signal display from proceed to stop from one of the main street movements while the other movement continued to receive the right of way display for the maximum time interval. As set forth hereinbefore, however, such a result is inefficient.

*Condition B (4)*

Now let it be assumed that with the circuit in the condition shown in FIGURE 7, the detectors for the various movements are actuated in the following order: First, the detector 28' for the movement 25; second, the detector 26 for the cross street movement 21 and then, the detector 30 for the main street movement 23. It will be seen that such a series of actuations will function to transfer the synchronization to the movements 23 and 22 through the condition in the circuit shown in FIGURE 11. In that figure, the closing of the detector 26 serves to energize the relay 188 through the circuit described in connection with FIGURE 10. The closing of the detector 28 serves to energize the relay 176' as described in connection with FIGURE 10. The closing of the detector 30, however, completes a circuit from the grounded line 104 through the closed detector 30, line 144, armature 112 and contact 116 of energized relay 108, line 146 through the coil of relay 130, line 152 which is connected to the hot power supply line 100, thereby energizing the relay 130. The energization of this relay and movement of the armature 132 upwardly into engagement with the contact 129 breaks the synchronization circuit described and shown in FIGURE 10 and completes a synchronization circuit from the lead 533 in controller I comprising line 144, line 160, contact 129 and armature 122 of relay 130, line 134, line 170, armature 172 and contact 174 of relay 176, line 178, contact 184 and armature 186 of relay 188, line 178', contact 114' and armature 116' of relay 108' to line 144' which is connected to the lead 533' and controller II, thereby synchronizing the detectors 30 and 30'. Similarly to FIGURES 7 and 10, the closing of cam contacts 277' in controller II causes the energization of relay 122' while the closing of the cam contacts 278 in controller I energizes the relay 108 to permit the synchronization circuits, just described, to be completed.

Again it will be seen with reference to FIGURE 11 that the phase synchronizer unit III has functioned in response to the actuations received on the various movements to maintain a right of way signal display to the non-conflicting movements 22 and 23 after the controllers have received a call from the cross street by virtue of the actuation of the detector 26.

*Condition C*

Let it now be assumed that the detectors 28' and 30' have been successively actuated. Referring to FIGURE 12, such actuation serves to synchronize these detectors through the circuit comprising lead 533 in controller I, line 144, armature 112 and contact 114 of the energized relay 108, line 178, contact 174 and armature 172 of relay 176, line 170, line 134, armature 136 and contact 138 of relay 140, line 134', armature 132' and contact 128' of relay 130', line 126', contact 124' and armature 120', line 118' which is connected to the lead 532'. Accordingly, it will be seen that further detector actuations of either of the detectors 30 or 28 will serve through the synchronization circuit shown in FIGURE 12 to place calls on both controllers I and II for continued display of the proceed signal to the movements 23 and 25 which are non-conflicting main street movements. When the controllers I and II are in the positions for display of right of way to the movements 23 and 23', the cam contacts 277 of controller I are closed, thus completing a circuit from the ground line 102 through line 110 and the coil of relay 122 through the closed contacts 277 through line 340 which is connected to the hot line 232 thereby energizing the relay 122. In like manner, the closing of the cam contact 278' and controller II completes a circuit from the common line 102 through line 110' through the coil of relay 108' to line 106' which is connected through the closed contacts 278' and line 340' to the hot line 232 thus energizing the relay 108. The energization of the relays 122 and 108' through the circuits just described prepares the phase synchronizer 3 for the various synchronization circuits which may be established in response to the order of actuation of the detectors associated with the various movements as will be next described.

*Condition C (1)*

For example, with the circuit in the condition shown in FIGURE 12, if the detector 30' is actuated, a circuit will be completed from the ground line 104', and referring now to FIGURE 13, through the closed detector 30', line 144', armature 112' and contact 116' of the energized relay 108' line 146' which is connected through the coil of relay 130', 182', which in turn is connected to the hot line 100 thus energizing the relay 130'. The energization of the relay 130' breaks the synchronization of the unit shown in FIGURE 12 and completes a synchronization circuit from the lead 533' in controller II through line 144', line 160', contact 129' and armature 132' of relay 130', line 134', contact 138 and armature 136 of relay 140, line 134, line 170, armature 172 and contact 174, line 178, contact 114 and armature 112, to line 144 which is connected to the lead 533 thereby synchronizing the actuations of the detectors 30 and 30' to maintain the right of way signal display to the non-conflicting main street movements 22 and 23.

*Condition C (2)*

With the circuit as shown in FIGURE 12, let it now be assumed that a detector actuation is received on the detector 28. This actuation will complete a circuit shown in FIGURE 14 from the ground line 104 through the detector 28, line 118, armature 120 and contact 125 of energized relay 122, line 180 which is connected through the coil of relay 176, line 152, which is connected to the hot line 100, thereby energizing the relay 176. The energization of the relay 176 breaks the synchronization circuit shown in FIGURE 12 and allows controller I to be cycled to present the right of way signal display to the movement 24 associated with the detector 28. Accordingly, when the controller I has so cycled, the detectors 28 and 28′ will become synchronized through the circuit shown and described in FIGURE 3.

*Condition C (3)*

If, however, a call or vehicle detector actuation is received on the detector 26 before the controller I has cycled from the position in which it is displayed the right of way signal display to the movement 23 associated with detector 30, movement 25 associated with the detector 28′, and movement 23 associated with the detector 30 will maintain their synchronization through the circuit shown in FIGURE 15.

In that figure, the detectors 28′, 26, 28 and 30 have been shown as being actuated. Assuming as set forth above that the actuation of the detector 26 came subsequent to the actuation of the detector 28 but prior to the cycling of controller I, the movement 25 associated with the detector 28′ and movement 23 associated with the detector 30, which movements are non-conflicting main street movements, will be maintained in synchronization through the following circuit. The closing of detector 26 completed a circuit from the grounded line 104 through the detector 26 to line 190 which is connected through the coil of relay 188 to the hot line 100 thus energizing the relay 188. The energization of the relay 188 completes a synchronization circuit between the detector 30 and detector 28′ comprising lead 533, line 144, armature 112 and contact 114 of relay 108, line 178, contact 184, and armature 186 of relay 188, line 178′, contact 174′ and armature 172′ of relay 176′, line 170′, line 134, armature 136, and contact 138 of relay 140, line 134′, armature 132′ and contact 128′ of the relay 130′, line 126′, contact 124′ and armature 120′ of relay 122′ to line 118′ which is connected to the lead 532′ thereby synchronizing detector actuation of the detectors 28′ and 30 to maintain the right of way signal display to the non-conflicting movements 25 and 23.

Again it will be seen that under this condition the phase synchronizer III has prevented the change of the right of way display to either of the movements 23 and 25 even though a call has been received on the cross street thus permitting both movements 25 and 23 to receive the maximum proceed signal display.

*Condition C (4)*

With the circuits in the condition shown in FIGURE 12, let it now be assumed that the following sequence of detector actuations is received. First, detector 28 is actuated. Next, detector 26 is actuated before controller I has cycled from the right of way signal display to movement 23 and finally, a detector actuation of the detector 30′. Under this sequence of events, the right of way synchronization will be completed between the movements 22 and 23 which are non-conflicting main street movements. Referring now to FIGURE 16, the actuation of the detector 28 for the movement 24 completes a circuit from the grounded line 104 through the detector 28 to line 118, armature 120 and contact 125 of the energized relay 122 to line 180 through the coil of the relay 176 to line 152 which is connected to the hot line 100, thus energizing the relay 176. The actuation of the detector 30 completed a synchronization circuit from the lead 533 through line 144, armature 112, and controller 114 of relay 108, line 178, contact 184 and armature 186 of relay 188, line 178′, contact 174 and armature 172′ of relay 176′, line 170′, line 134, armature 136 and contact 138 of relay 140, line 134′, armature 132′ and contact 129′ of relay 130′ to line 160′, which is connected through line 144′ to the lead 533′ thus synchronizing the detectors 30 and 30′. The relay 130′ became energized on the closing of the detector 30′ through the circuit comprising grounded line 104′, closed detector 30′, line 144′, armature 112′ and contact 116′ of energized relay 108′, line 146′ through the coil of relay 130′, to line 182′ which is connected to the hot line 100, thus energizing the relay 130′. Accordingly, it will be seen that the detectors 30 and 30′ are maintained in synchronization even though the cross street detector 26 had been actuated, whereby the right of way signal display is maintained to the movements 22 and 23 for the maximum time interval.

*Condition D*

Let it be assumed now detectors 30 and 30′ have been actuated successively, whereby controllers I and II have cycled to present the movements 23 and 22 associated with these detectors with the right of way signal display. In this position, as shown in FIGURE 17, controller I, cam contacts 277 are closed and cam contacts 277′ with controller II are closed, whereby the relays 122 and 122′ are energized through the following circuits. The energization of relay 122 is affected from the circuit comprising hot line 232, line 340, cam contacts 277, line 110, coil of relay 122 to the common return line 102. Relay 122′ is energized through the circuit comprising line 232′, line 340, closed cam contacts 277′, line 110′, coil of relay 122′, to line 110′ which is connected to the common return line 102. The energization of the relays 122 and 122′ prepares the phase synchronizer unit III for the synchronization circuits which will be shown and described hereinafter.

The actuation of the detectors 30 and 30′ completes a synchronization circuit between these detectors comprising line 533, line 144, armature 112 and fixed contact 114 of relay 108, line 178, contact 174 and armature 172 of relay 176, line 170, line 170′, armature 172′ and fixed contact 174′ of relay 176′, line 178′, contact 114′ and armature 112′ of relay 108′, and line 144′ to the lead 533′. As will be obvious, this synchronization circuit serves to maintain the right of way signal display to the movements 22 and 23 associated with the detectors 30′ and 30 respectively.

*Condition D (1)*

With the circuit in this condition, should a call be received on detector 28 associated with the movement 24, the synchronization movement shown in FIGURE 17 will be broken through the circuit shown in FIGURE 18, comprising grounded line 104, detector 28, line 118, armature 120 and fixed contact 125 of energized relay 122, line 180 through the coil of relay 176 to line 152 which is connected to the hot line 100, thus energizing the relay 176 and breaking the synchronization circuit shown in FIGURE 17 through the armature 172, and allowing controller I to cycle into position to present right of way to movement 24.

When this has occurred, the cam contacts 278 will close thus permitting a synchronization circuit between the detectors 28 and 30′ to be established since the relay 122 will become de-energized upon the opening of the cam unit contacts 277. The synchronization circuit for detectors 28 and 30′ will be as shown in connection with FIGURE 7.

*Condition D (2)*

With the circuit in the condition shown in FIGURE 17, let it now be assumed that the detector 28′ associated with the movement 25 is actuated. This condition of the circuit as shown in FIGURE 19 wherein the actuation of the detector 28′ completes a circuit from the grounded line 104′ through the detector 28′ to line 118′, armature 120′, and contact 125′ of relay 122′, line 152′ through the coil of relay 176′ to the hot line 100 thus energizing the relay 176′ and breaking the synchronizing circuit shown in FIGURE 17 through the armature 172′. Accordingly, when controller II has cycled to present the right of way signal display to the movement 25 associated with the detector 28′, a synchronization circuit between the detector 30 and the detector 28′ such as is shown in FIGURE 12 will become established.

*Condition D (3)*

Let it now be assumed with the circuit in the condition shown in FIGURE 17, a call is received first on the detector 28′ associated with movement 24 and immediately thereafter a call is received on the detector 26 associated with the cross street movement 21 before controller II has cycled to remove the right of way signal display from movement 23. The result, seen in FIGURE 20, is to establish and maintain a synchronization between the movements 22 and 23. This synchronization circuit between the detectors 30 and 30′ comprises lead 533 in controller I, line 144, armature 112, contact 114, line 178, contact 184 and armature 186 energized relay 188, line 178′, contact 114′ and armature 112′ of relay 108′ to line 144′ which is connected to the lead 533′ in controller II. This synchronization circuit was established by virtue of the actuation of the detector 26 which completed a circuit from grounded line 104 and line 190 through the coil of relay 188 to the hot line 100, thus energizing the relay 188 and completing the synchronization circuit just described through the armature 186.

*Condition D (4)*

Finally, let it be assumed with the circuit as in the condition shown in FIGURE 17, detector 28 associated with the movement 24 is first actuated and immediately thereafter, the detector 26 is actuated before controller I has cycled to remove the right of way signal display from the movement 23. Again, as shown in FIGURE 21, the synchronization between the detectors 30 and 30′ will be maintained through the circuit described in connection with FIGURE 20 and the synchronization circuit shown in FIGURE 17 does not become established due to the energization of the relay 176. This energization takes place through a circuit comprising grounded line 104, detector 26, line 118, armature 120 and fixed contact 125 of energized relay 122, line 180 through the coil of relay 176 to line 152 which is connected to the hot line 100 to energize the relay 176.

In FIGURE 22, a modification of the phase synchronizer circuit is shown and is the preferred embodiment of the circuit for the synchronizer unit. This modification was necessitated by reason of an inaccurate operation of the system under certain conditions when the circuit, shown in FIGURES 2 to 21, was utilized. This inaccurate operation became apparent under the following conditions. When controller I was resting in the position where the cam contacts 279 associated with movement one were closed (cam contacts 278 and 277 are also closed in this position as previously explained), and the cam contacts 277′ associated with movement five were closed due to the fact that the controller II was resting in the extension interval for movement two in which controller position cam contacts 279′ and 278′ are open, an actuation of the detector 30 associated with movement three acted to extend the interval in which the right of way was displayed to movement two to a maximum and this maximum interval was affected in response to only a single actuation of detector 30. As will be obvious, such an actuation of detector 30 should not operate to extend to a maximum the right of way signal display to the movement two associated with the detector 30′. Referring briefly to FIGURE 2, under the above outlined conditions, the relay 140 would be energized by virtue of the closing cam contacts 279 and hence when the detector 30 was closed, a circuit was completed from the lead 533 through line 144, armature 112 and fixed contact 116 of energized relay 108 (this relay being energized by virtue of the closed cam contacts 278) and line 146 through the coil of relay 130 to the hot line 100 thus energizing the relay 130. The energization of the relay completed a circuit from the line 144 through line 160, armature 132 and contact 129 of energized relay 130 to line 134, line 170′, armature 172′ and contact 174′ of relay 176′, line 178′, fixed contact 114′ and armature 112′ of relay 108′ to line 144′ which was connected to the lead 533′ and controller II. This, in turn, as above described by virtue of the actuation of detector 30 and the operation of controller II, extended the right of way display to movement two for a maximum period.

Referring now to the fragmentary circuit shown in FIGURE 22, which is a modification of FIGURE 2, the line 134 in FIGURE 2 has been disconnected from the junction point with the lines 170 and 170′ and is connected to the lower fixed point 194 of a second armature 195 and fixed contact 196 added to the relay 140. The armature 195 and armature 136 of the relay 140 are connected to a line 197, which in turn is connected to a junction with the lines 170 and 170′. With this change in circuitry and under the conditions described above, an actuation of the detector 30 will now break the circuit just described in connection with FIGURE 2 through the opening of the armature 195 which moved upwardly from the contact 194 which is connected to line 134 upon the energization of the relay 140 due to the closing of the cam contacts 279.

Occasionally, due to the method of manufacture of the components utilized by this invention, it was found that a false call was registered on one of the main street movements. This was due to the fact that the synchronizer unit synchronizes the main street movements of the right of way and occasionally, the proceed signal would be energized for a few milliseconds after the cam unit motor of one of the controllers had started to transfer the right of way to some other movement. If, during this brief period of time when the motor was running and the proceed signal was still energized, a detector actuation was registered on any of the detectors associated with the main street movements, a false call will be placed on the movement about to lose the right of way signal display, even though there was no demand on that movement. It is to be understood that this inaccuracy can be corrected by connecting the cam unit motors for both controllers in an OR circuit whereby energization of either motor will energize a relay which energization will serve to disconnect the main street detectors. This is a conventional OR circuit and accordingly comprise no part of the invention and therefore has not been shown in the drawings.

Consequently, it will be seen that the objects of the invention have been achieved through the utilization of the system and apparatus of the preferred embodiment of the invention; as described hereinbefore and illustrated in the drawings.

What I claim is:

1. A traffic control system for the intersection of a main street and cross street, each of said streets having a traffic lane for traffic progressing straight through said intersection, each approach to said intersection on said main street having a turning traffic lane, the traffic movement on said straight through lane and turn lane for each approach on said main street being non-conflicting, the traffic movement on said turning lanes being non-conflicting, the traffic movement on said straight through lanes of said main street being non-conflicting, the traffic movement on said through lanes of said cross street being conflicting with all of said movements on said main street, the traffic movement on each through lane of each approach of said main street being conflicting with the traffic movement on the turn lane of the opposite approach of said main street, detection means and signal means associated with each of said lanes, the signal means for two of said conflicting lanes on said main street being controlled by a first sequential controller, the signal means for the other two of said conflicting lanes on said main street being controlled by a second sequential controller whereby said first and second controllers may simultaneously present a right of way signal display sequence to any two of said non-conflicting lanes in response to actuation of the detection means associated with said lanes, said controllers being interconnected to jointly present a right of way signal display sequence to said cross street lanes in response to actuation of the detection means associated with said cross street lanes, synchronizing means interconnected with said first and second controllers and with the detection means for each movement and being operable to synchronize the detection means for any two of said non-conflicting lanes on said main street receiving the right of way signal display by connecting the detector means for said non-conflicting movements in parallel whereby said right of way signal display will be maintained for a predetermined maximum to said non-conflicting lanes in response to repeated actuation of the detection means associated with only one of said non-conflicting lanes during and after the actuation of detection means associated with certain of said conflicting lanes.

2. A traffic control system for controlling the movement of traffic through an intersection of first and second streets, one of said streets having a movement conflicting with all movements on the other street, said other street having a plurality of movements some of which are conflicting and others being non-conflicting, each of said movements having detector means and signal means associated therewith, controller means for presenting a right of way signal display to each movement for a predetermined time interval in response to a vehicle actuation of the detection means associated with said movement, said interval being extendable up to a maximum in response to additional vehicle actuations of said detector means, synchronizing means for synchronizing detector actuations on said non-conflicting movements, said synchronizing means being connected to said detector means and said controller means and being operable to connect in parallel the detector means for any pair of movements receiving the right of way signal display during and after a detector actuation on said one street whereby the right of way signal display will be maintained to said non-conflicting movements and will be extended for said maximum time interval in response to additional actuations of the detector means of only one of said pair of non-conflicting movements receiving the right of way signal display.

3. The traffic control system for controlling the flow of traffic through the intersection of a main street and a cross street, each of the approaches to the intersection on the main street having a straight through movement and a left turn movement, the cross street having a straight through movement conflicting with each of the movements on the main street, the straight through movement on each of the main street approaches being conflicting with the left turn movement on the opposite approach, and non-conflicting with each other and with its associated left turn movement, said left turn movement on each approach of said main street being non-conflicting with the left turn movement on the opposite approach of said main street, said system comprising a pair of full actuated three-phase traffic signal controllers, each of said movements being provided with traffic detector means and traffic signal means, the signal means associated with each pair of conflicting straight through and left turn movements on the main street being connected to and controlled by two phases on the same traffic signal controller, the traffic signal means for the movement on the cross street being jointly connected to and controlled by the third phase of the first and second controllers, said controllers being operable in response to actuation of the detector means associated with each movement to present a right of way signal display sequence to said movements in the order in which said actuations are received for a predetermined variable interval extendable in response to repeated actuations of said detector means from a minimum to a maximum time period, detector synchronizer means interconnected between said first and second controllers, said traffic detector means for each of said movements being connected to said three phase controllers through said synchronizer means, said synchronizer means being operable to transfer detector actuations received on said detector means to said controllers to present the right of way signal display simultaneously to any two non-conflicting movements receiving detector actuations, said synchronizer means being further operable to connect the detector means for any pair of non-conflicting movement receiving the right of way in circuit to simulate a call upon both detectors where only one of said detectors receives an actuation, whereby to continue to present the right of way signal display to said non-conflicting movements up to said maximum time period in response to continued actuation of only one of said detector means before and after the actuation of the detector means on said cross street.

4. A traffic control system for controlling the flow of traffic through an intersection having at least five distinct traffic movements, a first traffic movement conflicting with second, third, fourth and fifth traffic movements, a second traffic movement being non-conflicting with a third and fourth traffic movement but being non-conflicting with a fifth traffic movement, a third traffic movement being non-conflicting with said second and fifth traffic movements, but being conflicting with a fourth traffic movement, said fourth traffic movement being non-conflicting with said second and fifth movements, but being conflicting with said third movement, said fifth traffic movement being non-conflicting with said third and fourth movements, but conflicting with said second movement, said system comprising at least two multi-phase traffic controllers having index means for stepping said controllers through at least three separate and distinct phases, signal means and detector means individual to each of said movements, the signal means for said first movement being connected to and jointly controlled by the third phase of both of said multi-phase traffic controllers, the signal means for said third and fourth movements being controlled by the first and second phases of a first one of said controllers, and the signal means for said second and fifth movements being controlled by the first and second phases of the second one of said controllers, whereby to present a right of way signal display to said movements upon energization of the respective signal means so that said first movement can receive the right of way signal display when each of the remaining movements is receiving a stop signal display, and said second movement may receive the right of way simultaneous with either of said third or fourth movements and said third movement may receive the right of way signal indication simultaneous with either of said second or fifth movements, and said second and third movements may receive the right of way simultaneously, and said fourth and fifth movements may receive the right of way simultaneously, the detection means for each of said movements being connected to said controllers through synchronizing means interconnected between said controllers, said controllers being operable to extend the right of way signal display to any pair of non-conflicting movements by actuating said index means to step each of said controllers to the phases associated with the non-conflicting movements, said synchronizing means being operable to connect the detector means for any pair of non-conflicting movements receiving the right of way signal display in parallel to maintain said right of way display to said last mentioned movements in response to an actuation of the detector means for only one of said movements before and after the actuation of the detector means associated with the first movement.

5. A traffic control system for controlling the flow of traffic through an intersection of at least five traffic movements, one of said movements conflicting with each of the remaining four movements, each of said remaining four movements being conflicting with one of said four movements and non-conflicting with the other two of said movements, said system comprising a pair of multi-phase controllers, signal means and detector means associated with each movement, said signal means being connected to said controllers to cyclically present a right of way signal display including a proceed and clearance signal indication to said movements in response to actuation of the detector means associated with each movement whereby no two conflicting movements receive the right of way signal display simultaneously but any two non-conflicting movements may receive the right of way simultaneously, said detector means being connected to said controllers through synchronizer means interconnected between said controllers, said synchronizer means being operable when any two of said non-conflicting movements are receiving the right of way signal display to place the detector means associated with said movements in parallel to synchronize detector actuations received on only one of the detector means associated with either of said last mentioned movements to simulate a call on the other of said movements so as to maintain said right of way signal display to said movements before and after the actuation of the detector means associated with said movement conflicting with all other movements.

References Cited by the Examiner

UNITED STATES PATENTS 2,100,831 11/37 Barker ---------------- 340—37

FOREIGN PATENTS 535,709 4/41 Great Britain.

NEIL C. READ, *Primary Examiner.*

THOMAS B. HABECKER, *Examiner.*